(12) United States Patent
Powell et al.

(10) Patent No.: US 11,036,949 B2
(45) Date of Patent: *Jun. 15, 2021

(54) SCANNER WITH CONTROL LOGIC FOR RESOLVING PACKAGE LABELING CONFLICTS

(71) Applicant: Digimarc Corporation, Beaverton, OR (US)

(72) Inventors: Arthur L. Powell, Kent, WA (US); Tony F. Rodriguez, Portland, OR (US); Scott M. Long, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,904

(22) Filed: Feb. 13, 2020

(65) Prior Publication Data

US 2020/0257869 A1 Aug. 13, 2020

Related U.S. Application Data

(63) Continuation of application No. 16/384,527, filed on Apr. 15, 2019, now Pat. No. 10,565,415, which is a continuation of application No. 15/441,006, filed on Feb. 23, 2017, now Pat. No. 10,262,176.

(60) Provisional application No. 62/397,743, filed on Sep. 21, 2016, provisional application No. 62/395,282, filed on Sep. 15, 2016, provisional application No.
(Continued)

(51) Int. Cl.
*G06K 7/14* (2006.01)
*G06K 19/06* (2006.01)
*G06K 7/10* (2006.01)

(52) U.S. Cl.
CPC ......... *G06K 7/1413* (2013.01); *G06K 7/1408* (2013.01); *G06K 19/06028* (2013.01); *G06K 2007/10524* (2013.01)

(58) Field of Classification Search
CPC ........................... G06K 7/1413; G06K 7/1408
USPC .............. 235/472.01, 475, 462.42, 383, 454, 235/462.41, 462.02
See application file for complete search history.

(56) References Cited

U.S. PATENT DOCUMENTS

| 5,262,623 A | 11/1993 | Batterman |
| 5,365,048 A | 11/1994 | Komiya |

(Continued)

FOREIGN PATENT DOCUMENTS

WO 2013033442 A1 3/2013

OTHER PUBLICATIONS

US 9,438,765 B2, 09/2016, Holub (withdrawn)
(Continued)

*Primary Examiner* — Allyson N Trail
(74) *Attorney, Agent, or Firm* — Digimarc Corporation

(57) ABSTRACT

An automatic object identification scanner is equipped with recognition units that provide detection results for objects and a controller that resolves potential conflicts in the results. One form of recognition unit detects product identifiers and flags in a digital payload that is encoded redundantly across packaging or labels applied to packaging. The controller gets detection results and evaluates them relative to a state data structure, which maintains state for identifiers obtained within a time interval, such as a timeout interval or waiting period after a detection result. Identifiers are reported to a POS system depending on logic that evaluates code priority and pending waiting periods.

20 Claims, 21 Drawing Sheets

Related U.S. Application Data

62/322,193, filed on Apr. 13, 2016, provisional application No. 62/298,923, filed on Feb. 23, 2016.

(56) References Cited

U.S. PATENT DOCUMENTS

| | | |
|---|---|---|
| 5,841,886 A | 11/1998 | Rhoads |
| 5,859,920 A | 1/1999 | Daly |
| 5,862,260 A | 1/1999 | Rhoads |
| 5,949,885 A | 9/1999 | Leighton |
| 6,122,403 A | 9/2000 | Rhoads |
| 6,175,627 B1 | 1/2001 | Petrovic |
| 6,208,735 B1 | 3/2001 | Cox |
| 6,246,775 B1 | 6/2001 | Nakamura |
| 6,307,949 B1 | 10/2001 | Rhoads |
| 6,343,138 B1 | 1/2002 | Rhoads |
| 6,345,104 B1 | 2/2002 | Rhoads |
| 6,408,082 B1 | 6/2002 | Rhoads |
| 6,449,377 B1 | 9/2002 | Rhoads |
| 6,463,416 B1 | 10/2002 | Messina |
| 6,523,741 B1 | 2/2003 | Dimaria |
| 6,590,996 B1 | 7/2003 | Reed |
| 6,614,914 B1 | 9/2003 | Rhoads |
| 6,625,297 B1 | 9/2003 | Bradley |
| 6,687,385 B1 | 2/2004 | Handley |
| 6,698,658 B2 | 3/2004 | McQueen |
| 6,704,869 B2 | 3/2004 | Rhoads |
| 6,718,046 B2 | 4/2004 | Reed |
| 6,738,495 B2 | 5/2004 | Rhoads |
| 6,763,123 B2 | 7/2004 | Reed |
| 6,843,422 B2 | 1/2005 | Jones |
| 6,891,959 B2 | 5/2005 | Reed |
| 6,912,295 B2 | 6/2005 | Reed |
| 6,947,571 B1 | 9/2005 | Rhoads |
| 6,993,154 B2 | 1/2006 | Brunk |
| 7,006,662 B2 | 2/2006 | Alattar |
| 7,013,021 B2 | 3/2006 | Sharma |
| 7,016,516 B2 | 3/2006 | Rhoads |
| 7,043,052 B2 | 5/2006 | Rhoads |
| 7,044,395 B1 | 5/2006 | Davis |
| 7,046,819 B2 | 5/2006 | Sharma |
| 7,054,461 B2 | 5/2006 | Zeller |
| 7,058,200 B2 | 6/2006 | Donescu |
| 7,085,396 B2 | 8/2006 | Pelly |
| 7,113,596 B2 | 9/2006 | Rhoads |
| 7,116,781 B2 | 10/2006 | Rhoads |
| 7,130,442 B2 | 10/2006 | Braudaway |
| 7,158,654 B2 | 1/2007 | Rhoads |
| 7,213,757 B2 | 5/2007 | Jones |
| 7,231,061 B2 | 6/2007 | Bradley |
| 7,263,203 B2 | 8/2007 | Rhoads |
| 7,286,685 B2 | 10/2007 | Brunk |
| 7,330,563 B2 | 2/2008 | Rhoads |
| 7,349,555 B2 | 3/2008 | Rhoads |
| 7,352,878 B2 | 4/2008 | Reed |
| 7,369,678 B2 | 5/2008 | Rhoads |
| 7,370,190 B2 | 5/2008 | Calhoon |
| 7,478,067 B2 | 1/2009 | Messina |
| 7,602,977 B2 | 10/2009 | Rhoads |
| 7,607,016 B2 | 10/2009 | Brunk |
| 7,657,058 B2 | 2/2010 | Sharma |
| 7,724,920 B2 | 5/2010 | Rhoads |
| 7,762,468 B2 | 7/2010 | Jones |
| 7,796,826 B2 | 9/2010 | Rhoads |
| 7,856,116 B2 | 12/2010 | Rodriguez |
| 7,986,807 B2 | 7/2011 | Stach |
| 8,051,295 B2 | 11/2011 | Brunk |
| 8,059,858 B2 | 11/2011 | Brundage |
| 8,123,134 B2 | 2/2012 | Reed |
| 8,127,137 B2 | 2/2012 | Levy |
| 8,194,919 B2 | 6/2012 | Rodriguez |
| 8,243,980 B2 | 8/2012 | Rhoads |
| 8,245,926 B2 | 8/2012 | Guess |
| 8,301,893 B2 | 10/2012 | Brundage |
| 8,321,350 B2 | 11/2012 | Durst |
| 8,411,898 B2 | 4/2013 | Rhoads |
| 8,438,395 B2 | 5/2013 | Andelin |
| 8,473,209 B2 | 6/2013 | Nielsen |
| 8,543,823 B2 | 9/2013 | Carr |
| 9,008,192 B2 | 4/2015 | Rhoads |
| 9,087,376 B2 | 7/2015 | Rodriguez |
| 9,117,268 B2 | 8/2015 | Reed |
| 9,224,184 B2 | 12/2015 | Bai |
| 9,380,186 B2 | 6/2016 | Reed |
| 9,521,291 B2 | 12/2016 | Holub |
| 9,635,378 B2 | 4/2017 | Holub |
| 9,690,967 B1 | 6/2017 | Brundage |
| 9,716,807 B2 | 7/2017 | Holub |
| 9,727,941 B1 | 8/2017 | Falkenstern |
| 9,754,341 B2 | 9/2017 | Falkenstern |
| 9,892,478 B2 | 2/2018 | Calhoon |
| 10,078,878 B2 | 9/2018 | Bai |
| 10,198,782 B1 | 2/2019 | Bradley |
| 10,217,182 B1 | 2/2019 | Holub |
| 10,262,176 B1 | 4/2019 | Powell |
| 10,275,847 B2 | 4/2019 | Brundage |
| 10,460,161 B1 | 10/2019 | Lauer |
| 10,565,415 B2 | 2/2020 | Powell |
| 10,748,231 B2 | 8/2020 | Brundage |
| 2002/0009208 A1 | 1/2002 | Alattar |
| 2002/0054355 A1 | 5/2002 | Brunk |
| 2002/0157005 A1 | 10/2002 | Brunk |
| 2003/0002710 A1 | 1/2003 | Rhoads |
| 2003/0025423 A1 | 2/2003 | Miller |
| 2003/0033530 A1 | 2/2003 | Sharma |
| 2003/0147549 A1 | 8/2003 | Choi |
| 2003/0149879 A1 | 8/2003 | Tian |
| 2004/0001608 A1 | 1/2004 | Rhoads |
| 2004/0079804 A1 | 4/2004 | Harding |
| 2004/0181671 A1 | 9/2004 | Brundage |
| 2004/0263911 A1 | 12/2004 | Rodriguez |
| 2005/0157907 A1 | 7/2005 | Reed |
| 2008/0025554 A1 | 1/2008 | Landwehr |
| 2008/0149724 A1 | 6/2008 | Nishizawa |
| 2009/0060331 A1 | 3/2009 | Liu |
| 2009/0206161 A1 | 8/2009 | Olmstead |
| 2010/0123005 A1 | 5/2010 | Guess |
| 2010/0142003 A1 | 6/2010 | Braun |
| 2012/0000983 A1 | 1/2012 | Bhagwan |
| 2012/0104097 A1 | 5/2012 | Moran |
| 2013/0001290 A1 | 1/2013 | Trajkovic |
| 2013/0206839 A1 | 8/2013 | Gao |
| 2013/0223673 A1 | 8/2013 | Davis |
| 2013/0230239 A1 | 9/2013 | Feris |
| 2013/0329006 A1 | 12/2013 | Boles |
| 2013/0336525 A1 | 12/2013 | Kurtz |
| 2014/0021260 A1 | 1/2014 | Cherry |
| 2014/0027516 A1 | 1/2014 | Fushiki |
| 2014/0112524 A1 | 4/2014 | Bai |
| 2014/0258110 A1 | 9/2014 | Davis |
| 2014/0343719 A1 | 11/2014 | Collombet |
| 2015/0006672 A1 | 1/2015 | Morel |
| 2015/0030201 A1 | 1/2015 | Holub |
| 2015/0097032 A1 | 4/2015 | Olmstead |
| 2015/0156369 A1 | 6/2015 | Reed |
| 2015/0187039 A1 | 7/2015 | Reed |
| 2015/0199581 A1 | 7/2015 | Zhang |
| 2015/0302543 A1 | 10/2015 | Weaver |
| 2016/0105585 A1 | 4/2016 | Holub |
| 2016/0267620 A1 | 9/2016 | Calhoon |
| 2016/0275639 A1 | 9/2016 | Holub |
| 2016/0364623 A1 | 12/2016 | Evans |
| 2017/0004597 A1 | 1/2017 | Boles |
| 2017/0177656 A1 | 6/2017 | Johnson |
| 2018/0157883 A1 | 6/2018 | Cumoli |
| 2018/0157887 A1 | 6/2018 | D'Ercoli |
| 2018/0157888 A1 | 6/2018 | D'Ercoli |
| 2018/0157931 A1 | 6/2018 | D'Ercoli |
| 2018/0240212 A1 | 8/2018 | Calhoon |
| 2019/0236748 A1 | 8/2019 | Long |
| 2019/0385034 A1 | 12/2019 | Evans |
| 2020/0051200 A1 | 2/2020 | Brundage |

(56) References Cited

OTHER PUBLICATIONS

Avcibas, et al., 'Steganalysis of Watermarking Techniques Using Images Quality Metrics', Proceedings of SPIE, Jan. 2001, vol. 4314, pp. 523-531.

Dautzenberg, 'Watermarking Images,' Department of Microelectronics and Electrical Engineering, Trinity College Dublin, 47 pages, Oct. 1994.

Del Colle et al. "DWT based Digital Watermarking Fidelity and Robustness Evaluation", Apr. 2008, Journal of Computer Science and Technology, vol. 8, No. 1, p. 1-6.

Dot Product article, Wikipedia, Mar. 30, 2015. 8 pgs.

Fan, et al., 'LIBLINEAR: A Library for Large Linear Classification,' Journal of Machine Learning Research 9 (2008) 1871-1874.

Fridrich, Kodovsk & Holub, 'Steganalysis of Content-Adaptive Steganography in Spatial Domain,' Information Hiding, vol. 6958 of the series Lecture Notes in Computer Science pp. 102-117, 2011.

GS1 2D Barcode Verification Process Implementation Guideline: developed with the intention of providing a clear explanation on the practical implications of 2D Barcode Verification within the GS1 System. Release 1.3.21, Ratified, Jul. 2015. 40 pgs.

GS1 Bar Code Verification for Linear Symbols, Version 4.3, May 2009. 69 pgs.

Hernandez et al., 'Statistical Analysis of Watermarking Schemes for Copyright Protection of Images,' Proceedings of the IEEE, vol. 87, No. 7, Jul. 1999. 22 pgs.

Holub & Fridrich, 'Digital image steganography using universal distortion,' IH&MMSec '13 Proceedings of the first ACM workshop on Information hiding and multimedia security, pp. 59-68 (2013).

International Standard: ISO/IEC15415, 2nd ed. Dec. 15, 2011, "Information technology—Automatic identification and data capture techniques—Bar code symbol print quality test specification—Two-dimensional symbols". 52 pages.

J. Fridrich and J. Kodovsk , 'Rich models for steganalysis of digital images,' IEEE Trans. on Information Forensics and Security, 7(3):868-882, Jun. 2012.

J. Kodovsk , J. Fridrich, and V. Holub, 'Ensemble classifiers for steganalysis of digital media,' IEEE Trans. on Inform. Forensics and Security, 7(2):432-444, Apr. 2012.

Jan. 12, 2017 non-final Office Action; Jan. 13, 2017 Amendment; Mar. 15, 2017 Notice of Allowance; May 12, 2017 Amendment after Allowance; all from assignee's U.S. Appl. No. 15/154,572. 46 pgs.

Kodovsk , Fridrich & Holub, 'On dangers of overtraining steganography to incomplete cover model,' MM&Sec '11 Proceedings of the thirteenth ACM multimedia workshop on Multimedia and security, pp. 69-76 (2011).

Kutter, 'Watermarking Resisting to Translation, Rotation and Scaling,' Proc. of SPIE: Multimedia Systems and Applications, vol. 3528, pp. 423-431, Boston, Nov. 1998.

Lin et al., 'Rotation, Scale, and Translation Resilient Watermarking for Images,' IEEE Transactions on Image Pro U.S. Appl. No. 62/803,341 cessing, vol. 10, No. 5, May 2001, pp. 767-782.

May 19, 2017 Response to Amendment under Rule 312; May 12, 2017 Amendment after Notice of Allowance; Mar. 15, 2017 Notice of Allowance; Jan. 12, 2017 non-final Office Action; and Jan. 13, 2017 Amendment, all from assignee's U.S. Appl. No. 15/154,572. 48 pgs.

Nguyen et al. "Perceptual watermarking robust to JPEG compression attack", May 2012, IEEE, Proceedings of the 5th Int. Symposium on Communications, Control and Signal Processing 2012, p. 1-4.

Nikolaidis and Pitas., 'Region-based Image Watermarking,' IEEE Transactions on Image Processing, vol. 10, No. 11, Nov. 2001, pp. 1726-1740.

Nikolaidis et al., 'Region-Based Image Watermarking,' IEEE Transactions on Image Processing, vol. 10, No. 11, Nov. 2001, pp. 1726-1740.

O'Ruanaidh et al., 'Rotation, Scale and Translation Invariant Digital Image Watermarking,' Int. Conf. on Image Proc., Oct. 1997, IEEE, pp. 536-539.

O'Ruanaidh et al., 'Rotation, Scale and Translation Invariant Spread Spectrum Digital Image Watermarking,' Signal Processing 66, May 1, 1998, pp. 303-317.

O'Ruanaidh, 'Rotation, Scale and Translation Invariant Digital Image Watermarking,' Signal Processing, pp. 2-15, May 1, 1998.

Oct. 14, 2016 Preliminary Amendment, and Jan. 27, 2017 non-final Office Action; all from assignee's U.S. Appl. No. 14/881,448 (published as US 2016-0105585 AI). 17 pgs.

Pereira et al., 'Template Based Recovery of Fourier-Based Watermarks Using Log-Polar and Log-log Maps,' Proc. IEEE Int. Conf. on Multimedia Computing and Systems, vol. 1, Jun. 1999, pp. 870-874.

Pevny , P. Bas, and J. Fridrich, 'Steganalysis by subtractive pixel adjacency matrix,' IEEE Transactions on Information Forensics and Security, 5(2):215-224, Jun. 2010.

R. O. Duda, P. E. Hart, and D. G. Stork, 'Pattern Classification.' Wiley Interscience, 2nd edition, 2000. 737 pgs.

Sheng et al., 'Experiments on Pattern Recognition Using Invariant Fourier-Mellin Descriptors,' Journal of Optical Society of America, vol. 3. No. 6, Jun. 1986, pp. 771-776.

Su et al., 'An Image Watermarking Scheme to Resist Generalized Geometrical Transforms,' Proc. SPIE vol. 4209: Multimedia Systems and Applications III, Nov. 2000, pp. 354-365.

Su et al., 'Synchronized Detection of the Block-based Watermark with Invisible Grid Embedding,' Proc. SPIE vol. 4314: Security and Watermarking of Multimedia Contents III, Jan. 2001, pp. 406-417.

U.S. Appl. No. 15/063,381, filed Oct. 17, Response to Amendment under Rule 312; Oct. 10, 2017 Amendment after Notice of Allowance; Sep. 27, 2017 Notice of Allowance; Mar. 7, 2016, including Aug. 18, 2017 Response to Restriction; Aug. 3, 2017 Restriction; May 23, 2016 Preliminary Amendment. 35 pgs.

U.S. Appl. No. 62/129,655, filed Mar. 6, 2015. 17 pgs.

Wang et al. "OR-Benchmark: An Open and Reconfigurable Digital Watermarking Benchmarking Framework", Jun. 2015, arXiv.org, <https://arxiv.org/abs/1506.00243>, p. 1-15.

Amendment filed Jul. 29, 2020 in U.S. Appl. No. 16/264,413. 11 pgs.

Notice of Allowance, Notice of Allowability and Reasons for Allowance, dated Oct. 15, 2020 in U.S. Appl. No. 16/264,413. 11 pgs.

```
import sys

# The timeout interval, or time period within which codes are
# assumed to be scanned from the same physical package. This
# can be in whatever units are appropriate for your system.
# In this demonstration, the frame number is used as the unit
# of time, but a different unit could be used, such as
# milliseconds relative to a timebase. Whatever units are
# chosen, they must be the same units as what is passed in
# current_time when calling the filter.
TIMEOUT_INTERVAL = 5

# This class represents the state and logic of the GTIN filter.
class mmgtin_filter:
    # Initialize the filter.
    def __init__(self):
        # This variable tracks the current state (possible values
        # 0, 1, 2)
        self.state = 0

# This variable tracks the last GTIN received from either
        # DB or 1D decoders
        self.last_gtin = None

# This variable tracks the last GTIN received from the DB
        # decoder
        self.last_digimarc = None

# This variable caches the set of GTINs which are
        # blacklisted from Digimarc reporting
        self.blacklist = set()

# This variable tracks the timeout expiration time
        self.timeout = 0

# This function is called to add a GTIN to the blacklist
    def add_to_blacklist(self, gtin):
        self.blacklist.add(gtin)

# This function is called to determine if a GTIN is on the
    # blacklist.
    def gtin_is_blacklisted(self, gtin):
        return gtin in self.blacklist
```

Fig. 15A

```
# MAIN FILTER ALGORITHM.

# gtin - The GTIN to be filtered.
# is_digimarc - True if the GTIN was a DB, False if it was a 1D
# current_time - The current timestamp. Units don't matter, but
#      must be the same units as TIMEOUT_INTERVAL

# Returns True if the GTIN should be processed as usual, or
# False if the GTIN should be filtered out.
def allow_gtin(self, gtin, is_digimarc, current_time):
    if is_digimarc and self.gtin_is_blacklisted(gtin):
        return False
    if current_time >= self.timeout:
        self.state = 0
        self.last_gtin = None
        self.last_digimarc = None
    self.timeout = current_time + TIMEOUT_INTERVAL if self.state == 0:
        self.last_gtin = gtin
        if is_digimarc:
            self.last_digimarc = gtin
        self.state = 1
        return True if self.state == 1:
        if gtin != self.last_gtin:
            if self.last_digimarc is not None:
                self.add_to_blacklist(self.last_digimarc)
            if is_digimarc:
                self.add_to_blacklist(gtin)
                self.last_digimarc = gtin
            self.state = 2
            return False
        return not is_digimarc if self.state == 2:
        if is_digimarc:
            self.add_to_blacklist(gtin)
        return False
```

Fig. 15B

```
# TEST PROGRAM. Code below this point is not part of the algorithm,
# but can be used to experiment with and test the algorithm.
print 'TIMESTAMP,TYPE,GTIN'
mmg = mmgtin_filter()
inf = open(sys.argv[1], 'r')
inf.readline()
for line in inf.xreadlines():
    fields = line.strip().split(',')
    timestamp = int(fields[0])
    db = fields[1]
    upc = fields[2]
    beep = False
    if db and mmg.allow_gtin(db, True, timestamp):
        print '%d,DB,%s' % (timestamp, db)
        beep = True
    if upc and mmg.allow_gtin(upc, False, timestamp):
        print '%d,UPC,%s' % (timestamp, upc)
        beep = True
    if not beep:
        print '%d,,' % timestamp
```

Fig. 15C

```
import sys

# The timeout interval, or time period within which codes are
# assumed to be scanned from the same physical package. This
# can be in whatever units are appropriate for your system.
# In this demonstration, the frame number is used as the unit
# of time, but a different unit could be used, such as
# milliseconds relative to a timebase. Whatever units are
# chosen, they must be the same units as what is passed in
# current_time when calling the filter.
TIMEOUT_INTERVAL = 5

MAX_LABELS_IN_BLACKLIST = 64

# This class represents the state and logic of the GTIN filter.
class mmgtin_filter:
    # Initialize the filter.
    def __init__(self):
        # This variable tracks the current state (possible values
        # 0, 1, 2, 3)
        self.state = 0

# This variable tracks the last GTIN received from either
        # DB or 1D decoders
        self.last_gtin = None

# This variable tracks the last GTIN received from the DB
        # decoder
        self.last_digimarc = None

# This variable caches the set of GTINs which are
        # blacklisted from Digimarc reporting
        self.blacklist = {}

# This variable tracks the timeout expiration time
        self.timeout = 0

# The sequence number of the next blacklist update
        self.sequence = 0

# This variable tracks the last known time passed to the filter
        self.last_known_time = 0
```

Fig. 18A

```
# This function is called to add a GTIN to the blacklist
    def add_to_blacklist(self, gtin):
        if len(self.blacklist) == MAX_LABELS_IN_BLACKLIST:
            # Purge oldest label from the blacklist
            oldest = -1
            oldestGtin = None
            for blgtin, seq in self.blacklist.items():
                if oldest < 0 or seq < oldest:
                    oldest = seq
                    oldestGtin = blgtin
            del self.blacklist[oldestGtin]
        self.blacklist[gtin] = self.sequence
        self.sequence += 1

# This function is called to determine if a GTIN is on the
    # blacklist.
    def gtin_is_blacklisted(self, gtin):
        if gtin in self.blacklist:
            self.blacklist[gtin] = self.sequence
            self.sequence += 1
            return True
        return False
```

Fig. 18B

```
# MAIN FILTER ALGORITHM.
    #
    # gtin - The GTIN to be filtered.
    # is_digimarc - True if the GTIN was a DB, False if it was a 1D
    # current_time - The current timestamp. Units don't matter, but
    #      must be the same units as TIMEOUT_INTERVAL
    #
    # Returns True if the GTIN should be processed as usual, or
    # False if the GTIN should be filtered out.
    def allow_gtin(self, gtin, is_digimarc, current_time):
        if is_digimarc and self.gtin_is_blacklisted(gtin):
            return False
        if current_time >= self.timeout or current_time < self.last_known_time:
            self.state = 0
            self.last_gtin = None
            self.last_digimarc = None
        self.timeout = current_time + TIMEOUT_INTERVAL
        self.last_known_time = current_time if self.state == 0:
            self.last_gtin = gtin
            if is_digimarc:
                self.last_digimarc = gtin
                self.state = 1
            else:
                self.state = 3
            return True if self.state == 1:
            if gtin != self.last_gtin:
                if self.last_digimarc is not None:
                    self.add_to_blacklist(self.last_digimarc)
                if is_digimarc:
                    self.add_to_blacklist(gtin)
                    self.last_digimarc = gtin
                self.state = 2
                return False
            return not is_digimarc if self.state == 2:
            if is_digimarc:
                self.add_to_blacklist(gtin)
            return False if self.state == 3:
            return not is_digimarc
```

Fig. 18C

```
# TEST PROGRAM. Code below this point is not part of the algorithm,
# but can be used to experiment with and test the algorithm.
if __name__ == '__main__':
    print 'TIMESTAMP,TYPE,GTIN'
    mmg = mmgtin_filter()
    inf = open(sys.argv[1], 'r')
    inf.readline()
    for line in inf.xreadlines():
        if line.startswith('#'):
            # Skip comments
            continue
        fields = line.strip().split(',')
        timestamp = int(fields[0])
        db = fields[1]
        upc = fields[2]
        beep = False
        if db and mmg.allow_gtin(db, True, timestamp):
            print '%d,DB,%s' % (timestamp, db)
            beep = True
        if upc and mmg.allow_gtin(upc, False, timestamp):
            print '%d,UPC,%s' % (timestamp, upc)
            beep = True
        if not beep:
            print '%d,,' % timestamp
```

Fig. 18D

SCANNER WITH CONTROL LOGIC FOR RESOLVING PACKAGE LABELING CONFLICTS

RELATED APPLICATION DATA

This application is a continuation of U.S. application Ser. No. 16/384,527, filed Apr. 15, 2019 (now U.S. Pat. No. 10,565,415), which is a continuation of U.S. application Ser. No. 15/441,006, filed Feb. 23, 2017 (now U.S. Pat. No. 10,262,176) which claims the benefit of U.S. Provisional Application Nos. 62/298,923, filed Feb. 23, 2016, 62/322,193, filed Apr. 13, 2016, 62/395,282 filed Sep. 15, 2016, and 62/397,743, filed Sep. 21, 2016, which are hereby incorporated by reference in their entirety.

TECHNICAL FIELD

The invention relates to automatic identification of objects and related image signal processing.

BACKGROUND AND SUMMARY

Barcodes have dramatically transformed the efficiency of retail store operation. Nevertheless, correct identification and handling of products is challenging when there are potentially conflicting labels applied to items or groups of items. Such conflict often arises in the following scenarios:

1. groups of separately marked items sold as a unit (e.g., a family pack);
2. items marked with price change labels (e.g., a discount or fixed price label).

In the first case, error occurs when items are recognized and priced individually rather than as a group. In some configurations, a pack is constructed with an over-wrap that obscures barcodes on individual items. The overwrap carries a separate barcode for the family pack. Conflict occurs when a scanner reads barcodes for individual items and the family pack or misses the barcode of the family pack. Conflict also occurs when the scanner reads the barcode of the family pack and then individual items, without treating the individual items as part of the pack. In another family pack configuration, the individual items are held in a carrying case that bears the barcode of the family pack. The individual items may be oriented to obscure their barcodes, yet they may still be visible. The items within a pack may be different items that the retailer wishes to sell together or multiple instances of the same item in a group. In the former situation, each of the items contains a different barcode, which is also different than the group barcode. In all these cases, errors occur when the scanner provides decoded product codes for the individual items in the family pack.

In the case of price change labels, error occurs when the scanner or checker misses the price change item, and instead, only provides the product code for the product without the price change. Additional slowing occurs in the check-out process when the checker is required to manually enter the change in price.

Other errors may occur due to conflicting codes inserted in product packaging artwork or printing errors. In the former case, a package design file may encompass design elements, each bearing a different product code, which may conflict in some cases. Also, the package design file may include references to artwork in other files, which is composited to produce the package design image prior to printing. In this image assembly process, conflicting codes may be incorporated from the artwork in the reference files. In the latter case, conflicting codes may be printed due to printing plates that apply imagery with conflicting codes. Also, printing may occur with plural print stages, in which a first print technology like flexography or offset applies a first design to a package substrate, and a second print technology like a digital offset or inkjet applies a second design to a package substrate.

The problem with these scenarios is that they cause pricing error and slow down the check-out process. Below, we describe approaches for scanner devices to identify items accurately and at higher speed while minimizing use of processing resources within the POS system or requiring manual intervention by the checker.

In our prior work, we have detailed methods for robust encoding of auxiliary data in objects. In this work, we describe methods to encode machine readable data redundantly within two-dimensional spatial blocks across an image to create an enhanced image with an auxiliary data carrier. This enhanced image is applied to objects by printing it on packaging or labeling with commercial presses, or directly applying the image by marking the object, with ink jet, laser marking, embossing, photographic, or other marking technology. This redundant marking is particularly useful for automatic identification of objects, as it is able to be merged with other imagery (instead of occupying dedicated spatial area like conventional codes) and enables reliable and efficient optical reading of the machine-readable data from various different views of the object. See, e.g., U.S. Pat. Nos. 6,102,403 and 6,614,914, U.S. application Ser. No. 14/724,729 (Now U.S. Pat. No. 9,747,656), Ser. No. 14/725,399 (Now U.S. Pat. No. 9,635,378), and US Publications 20100150434 (with encoding applied to color channels of image content rendered for printing or display), which are hereby incorporated by reference.

One inventive aspect described in this disclosure is a scanner with control logic that resolves code conflicts based on detection results from one or more recognition units in the scanner. The scanner includes a processor that controls illumination and image capture by an imager of an object within its view volume. A processor executes a controller process to receive a detection result from a recognition unit for image frames captured of an object or objects in the view volume. For some objects, the detection results acquired from sensing the object within a scan operation (typically under 1 second) includes an outer or inner code, or both. An example of an outer code is an identifier of a family pack or price change label, while an example of an inner code is an identifier of a family pack member or product identifier of a product with a price change label attached.

The controller analyzes the detection result by comparing the detection result with state stored for a prior detection result during the scan operation to determine whether to initiate one of plural types of waiting periods based on the type of detection result and comparing the detection result with a prior result in a state data structure. The controller sets the waiting period to control reporting of an outer code relative to an inner code on the package. It enforces a first type of waiting period and control logic to control reporting of an inner code after detection of an outer code and a second type of waiting period and control logic to delay reporting of an inner code until the second type of waiting period ends. Variations of the waiting period and control logic are described further below.

One aspect of the invention is a method of automatic product identification in a POS system. The method, executing in a processor, obtains a first detection result from a first recognition unit. This first recognition unit is configured to detect a digital payload from a two-dimensional code in which the digital payload is encoded within an image captured of a first object in a view volume of a scanner. It obtains a second detection result from a second recognition unit. The second recognition unit is configured to detect a digital payload from a one-dimensional barcode within an image captured of the first object. It determines presence of a conflict among the two-dimensional and one-dimensional code by proximity of the two-dimensional code to the one-dimensional barcode in time or location on the first object. It determines identity of the first object to use in associating price with the first object in a POS system based on the determining of the presence of the conflict. Variants of the invention are described for implementation in POS systems and in computer instructions on computer readable media.

Additional aspects of the invention include control logic and associated methods for integrating this control logic within automatic identification devices, and various configurations and types of recognition units and controller logic for determining when and how to report identification in the presence of plural conflicting and duplicative detection results.

Further advantages and features are described and illustrated in the detailed description and drawings below.

BRIEF DESCRIPTION OF THE DRAWINGS

FIGS. 15A-C provide Python code detailing an embodiment of scanner control logic for generating a blacklist dynamically.

FIGS. 18A-D provide Python code detailing an embodiment of scanner control logic for generating a blacklist dynamically.

DETAILED DESCRIPTION

Figure 1:
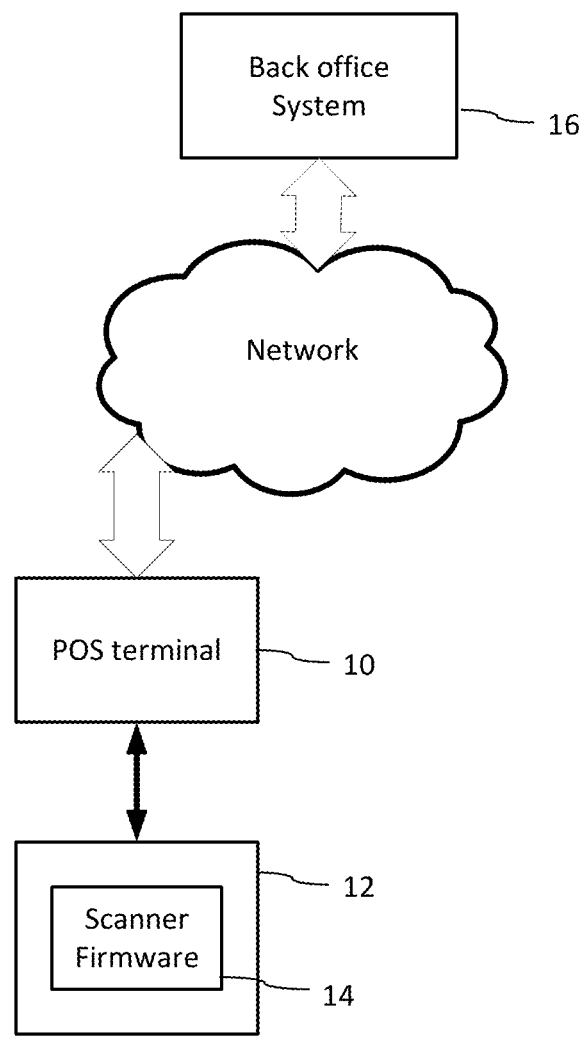
FIG. 1 is a system diagram illustrating components of a point of sale system in a retail store.

FIG. 1 is a system diagram illustrating components of a point of sale system in a retail store. Each check-out station is equipped with a POS terminal 14 and scanner 12. The scanner has a processor and memory and executes scanner firmware, as detailed further below. The POS terminal is a general-purpose computer connected to the scanner via a standard cable or wireless interconnect, e.g., to connect the scanner directly to a serial port, keyboard port, USB port or like port of the POS terminal or through an interface device (e.g., a wedge). Each of the POS terminals are connected via a network to the store's back office system 16.

Items in the store are assigned an identification number in a numbering scheme managed by GS1 called a Global Trade Identification Number (GTIN). The GTIN plays a vital role within store operations as it identifies products and acts as a database key to associate the product with product attributes including its name and price. For many products, the GTIN is assigned by the manufacturer of the item and encoded in the packaging, via a UPC Symbol and, preferably, a digital encoding that replicates the GTIN in two-dimensional tiles across the package design, as detailed further below. One example of such tiled data encoding is a Digimarc Barcode data carrier from Digimarc Corporation of Beaverton, Oreg. The retailer's system has a database of item files for each of the products it sells. This item file includes various attributes of the item that the store uses to manage its operation, such as price, scanning description, department ID, food stamp information, tax information, etc. The POS terminal retrieves this information as needed from the back office by querying the database with the item identifier (e.g., a GTIN of the product provided by the scanner).

A barcode, preferably the Digimarc Barcode data carrier, is used to convey family pack identifiers and price change codes on packaging. For family packs, the retailer or manufacturer assigns a GTIN as the product identifier of the pack, and creates an associated item file for that pack. The GTIN is encoded in a conventional barcode and/or the Digimarc Barcode data carrier applied to the over-wrap or carrier of the pack. The Digimarc Barcode data carrier is advantageous because it replicates the GTIN across the package to provide more efficient and reliable decoding of a GTIN, and has additional data capacity to carry one or more flags indicating to the scanner that family pack or price change processing logic applies.

Barcodes, and in particular, Digimarc Barcode data carriers, are preferably used to convey price change information in labels applied to product packaging. Price changes are usually of one of the following two types: a discount code, or a new fixed price. In the former, the discount code references a monetary amount to be reduced from the price assigned to the item's GTIN. In the latter, the code references a new fixed price that replaces the price assigned to the item's GTIN. The Digimarc Barcode data carrier also includes a flag indicating that price change processing logic applies in the scanner. As an additional or alternative means to trigger processing logic, the price change label may have other detectable properties, such as a color or spectral composition, shape, RFID tag, image template, or marking that the scanner's recognition unit(s) can detect.

Price changes are typically managed by department within a retailer. This enables the managers of the departments, such as the bakery, meat, product and deli departments, to determine when and how much to discount items that they wish to move from their inventory. The price change information includes a department identifier, enabling the retailer's system to track the price change to the department. The new fixed price or price change may be encoded directly in the digital payload of the data carrier printed on the price change label. Alternatively, the fixed price or discount may be stored in an item record and looked up by the POS using the code decoded from the payload. In some systems, a GTIN identifying a product or class of products to which the price change applies may be included in the payload of the data carrier on the product as well.

For some products, the product information, such as the GTIN, is printed by a label printer within the store. One example is a label printer within a scale, which is used to weigh and print a label for a variable weight item. The GTIN format includes fields used to encode the variable nature of such items by encoding a variable amount (e.g., variable weight) or a variable price. Preferably this GTIN is encoded on the label with a Digimarc Barcode data carrier, though conventional barcodes may also be used.

Variable items are a prime example of items that often are subject to price changes. To facilitate price changes, a label with the price change is applied to the item as described above. This label may be applied over the prior label to obscure it, or may be applied next to it. The label printer in the store may be configured to print a price change label, which fits over the original label, or complements it. In either case, the scanner decodes the code or codes it detects on the package, and its processing logic issues the correct product and pricing information to the POS system.

The back office system maintains a database of item file information in its memory (persistent and volatile memory (e.g., RAM), as needed). It uses the GTIN to associate a product with the product attributes and retrieves these attributes and delivers them to the scanning application software of the POS terminal in response to database queries keyed by the GTIN or like item code. Item files are also created for family pack items and price change labels. In some configurations, the item database is mirrored within the POS terminals of the retail store, and each POS terminal executes item look up operations within its local copy of the item database.

During the scanning operation, the POS scanning application software obtains the output of the scanner, which is comprised of the recognized codes, e.g., GTIN, price change code, or like code. It then does a look up, either locally or via the back office to get related attributes for each code. With these attributes, the POS software executes typical POS functions, such as displaying product name and price during check-out, tabulating total price, with taxes and discounts, coupons, etc.; managing payment, and generating a receipt. Importantly, the POS software need not be modified to handle family pack configurations and price changes. Instead, the scanner logic resolves potential code scanning conflicts and reports the resolved code or codes in a fashion that the POS terminal is accustomed to seeing.

A scanning application executes within each of the store's POS terminals. This application is responsible for obtaining the codes reported by the scanner hardware and performing the attribute look up operation. It receives each code from the scanner, in response to the scanner decoding UPC and Digimarc Barcode data carrier during check-out. A processor in the scanner executes firmware instructions loaded from memory to perform these decoding operations.

Figure 2:
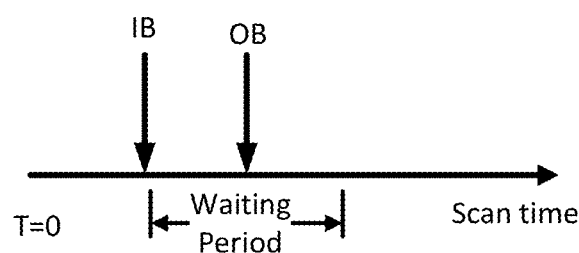
FIG. 2 is a diagram illustrating a sequence of decode operations by a scanner.
Figure 3:
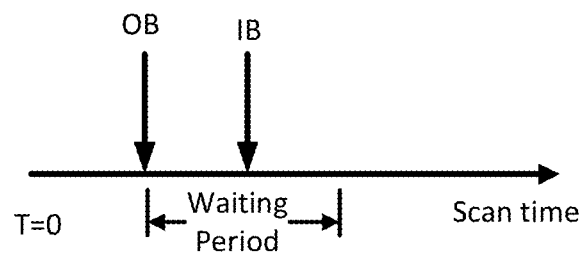
FIG. 3 is a diagram illustrating another sequence of decode operations by the scanner.

Processing logic within the scanning operation handles the above-described cases of family pack and price changes. FIGS. 2 and 3 are diagrams illustrating sequencing of decode operations to set the stage for the processing logic that interprets the sequence. During check out at the POS terminal, the scanner executes recognition operations on image frames captured while a product package or packages move through its field of view. From mere decoding of conventional barcodes, it is not determinable whether the barcodes originate from the same or different objects. To address this, we have incorporated new features in encoding on the package and logic within the scanner.

For purposes of illustration, we introduce the concept of an "inner barcode," (TB) and "outer barcode" (OB). The inner barcode corresponds to a barcode of an individual item in a family pack or the original barcode on a package, before a price change label is added. The "outer barcode" corresponds to a barcode of the family pack or a price change label. Though the family pack code may indeed be outside the member item code (e.g., in the case of an over-wrap), it need not be. The same is true for the price change label relative to the original barcode on a product.

Inner and outer barcodes are examples of a broader category of inner and outer codes detected by the scanner. These codes may be detected by image recognition methods, of which optical code reading is a subset. Other forms of image recognition are feature extraction and matching and template matching (e.g., a price change label template), to name two examples. They may also be detected by other sensor types, such as RFID, and a combination of sensor input, e.g., weight from a scale (e.g., to distinguish a family pack from a family pack member), geometric features from image feature extraction (including depth from a depth sensor), and spectral information (color such as a color histogram of a detected object, or pixel samples from spectral bands obtained by multi-spectral illumination and/or multi-spectral filters).

FIG. 2 illustrates a sequence in which decoding of an inner barcode precedes an outer barcode. Whenever the scanner decodes an inner barcode, it does not immediately report it. Instead, it pauses for a predetermined delay, e.g., in the range of around 500 ms. The amount of this delay may be specified in relative or absolute time by a flag in the data carrier (namely, in the digital data encoded in the family pack or family pack member). If the next barcode is an outer barcode of a family pack, the scanner logic reports only the GTIN for the family pack.

If the outer barcode is a price change, the scanner logic reports it. The scanner logic that controls which code or codes to report depend on whether the price change is a fixed price or a discount code. For a fixed price code, that fixed price code replaces the code from the inner barcode as it provides the code that the POS terminal uses to query the back office database for the new price. For a discount code, the logic causes the scanner to report the discount code as well as the code from first detected barcode that triggered the waiting period.

In these scenarios, data flags are encoded in the inner and/or outer barcode data carriers to signal to the scanner that an outer barcode may accompany the inner barcode. For family packs, for example, the inner barcode of FIG. 2 signals that it is part of a family pack, which in turn, triggers a waiting period for the scanner to detect an outer barcode.

If no outer barcode is decoded in the waiting period, then scanner reports the inner barcode to the POS terminal.

FIG. 3 illustrates a sequence in which decoding of an outer barcode precedes an inner barcode. This sequence may occur, for example, following the decoding of the outer barcode of FIG. 2. In this case, the scanner logic similarly waits for a predetermined period of time (e.g., 500 ms). A barcode decoded in the waiting period is ignored if a family pack flag is set because a barcode detected in this waiting period is deemed to be from the same family pack. The time range for the waiting period may vary with the device, as each device has different image capture systems, with different field of view parameters, which govern the number and type of views captured of an object or group of objects as they are scanned in the scanner view volume. Checker usage patterns also govern the waiting period, as they also impact movement of objects through the view volume, and/or how the checker employs the scanner to image objects. The waiting period can range from around 300 ms to 1.5 seconds.

For a price change label, the logic depends on the type of price change. For a fixed price code detected as the OB of FIG. 3, an inner barcode detected in the waiting period is ignored. For a discount code, the inner barcode in the waiting period is reported.

Having illustrated high level operation of the scanner logic, we now provide additional implementation details. The details of the implementation vary with the hardware and software configuration of the scanner, as well as the type of codes and recognition processes employed within the scanner.

Image based scanners typically fall into two classes: fixed and hand-held. Fixed scanners are designed to be integrated within a check-out station, at which the operator or a conveyor moves items in the field of the scanner's image capture system. The image capture system is comprised of optical elements, such as a lens, mirror(s), beam splitter(s), 2D imager (e.g., CMOS camera), which together enable capture of plural views of an object that are combined into a single frame. Additionally, an illumination source is also included to illuminate the object for each capture. See, e.g., US Publications 2009206161A and US2013206839A, which are incorporated by reference.

Hand-held scanners are, as the name implies, designed to be held in the hand and pointed at objects. They have different optical systems adapted for this type of capture, including lens, sensor array adapted for capturing at varying distances, as well as illumination source for illuminating the object at these distances.

These image based systems capture frames in range of around 10 to 90 frames per second. In some imager based scanners, processing of a frame must be complete prior to the arrival of the next frame. In this case, the scanner processing unit or units have from 10 to 100 ms to decode at least one code and perform other recognition operations, if included.

In other imager based scanners, image processing of image frames is governed by time constraints, not strictly frames. In this form of real time image processing, the processing unit or units within the device process frames concurrently but when processing capacity reached, some frames get dropped, and processing resumes on subsequent frames when processing capacity is available. This type of resource management is sometimes employed opportunistically in response to detecting an object in the view volume of the scanner's imaging system. For example, as a new object enters the view volume, an image process executing within the scanner detects it and launches decoding processes on subsequent frames.

Figure 4:
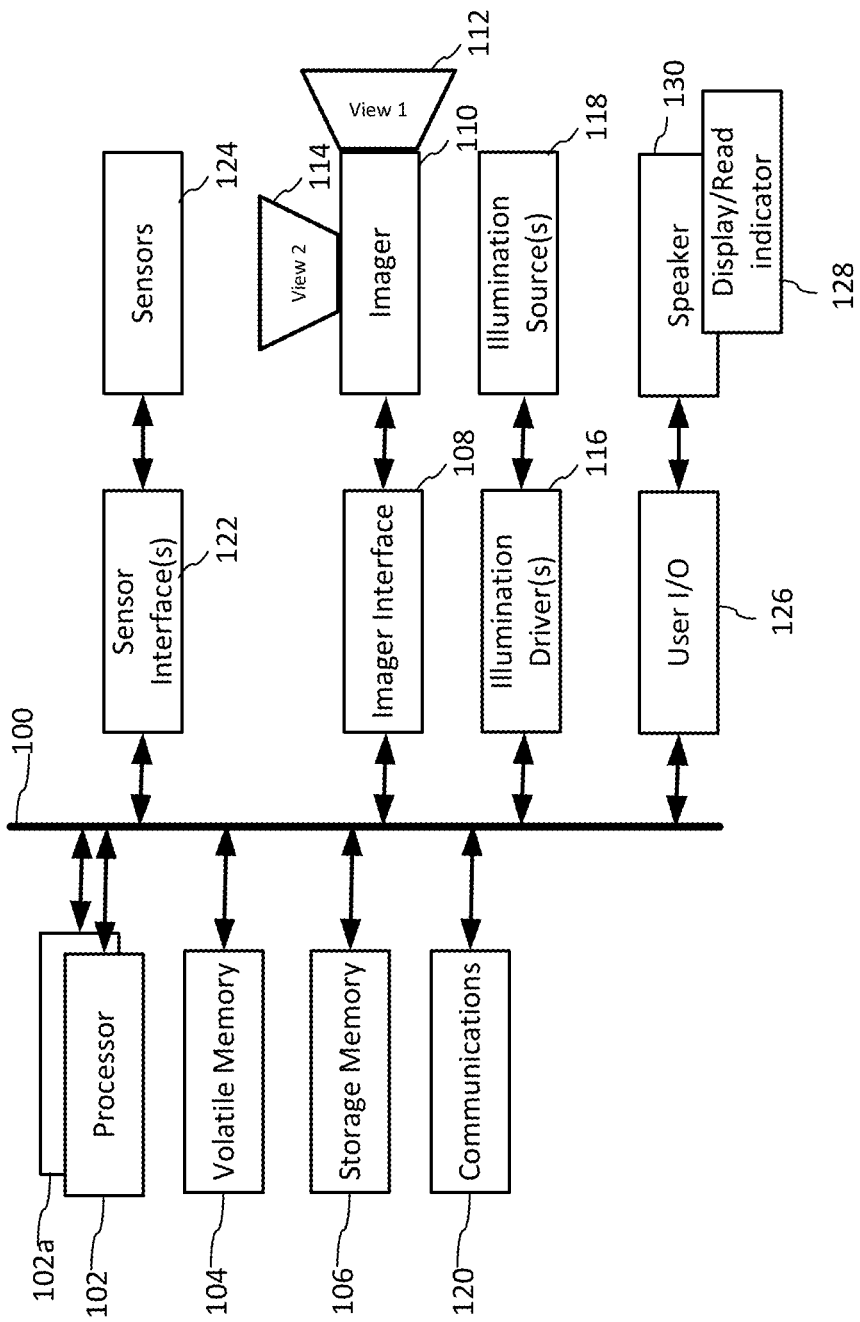
FIG. 4 is a diagram of components in an imager-based scanner.

For the sake of illustration, FIG. 4 is a diagram of components in an imager based scanner. Our description is primarily focused on fixed, multi-plane imager based scanner. However, it is not intended to be limiting, as the embodiments may be implemented in other imaging devices, such as hand-held scanners, smartphones, tablets, machine vision systems, etc.

Please also see the specification of assignee's co-pending application Ser. No. 14/842,575, HARDWARE-ADAPTABLE WATERMARK SYSTEMS (Now published as US 2017-0004597), which is hereby incorporated by reference. This specification describes hardware configurations for reading machine readable data encoded on objects, including configurations usable with imager based scanners used in automatic identification applications.

Referring to FIG. 4, the scanner has a bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 facilitates both DMA transfers and direct processor read and write instructions. In one embodiment, the bus 100 is one of the Advanced Microcontroller Bus Architecture (AMBA) compliant data buses. Although FIG. 4 illustrates an embodiment in which all components are communicatively coupled to the bus 100, one or more components may be communicatively coupled to a separate bus, and may be communicatively coupled to two or more buses. Although not illustrated, the scanner can optionally include one or more bus controllers (e.g., a DMA controller, an I2C bus controller, or the like or combination thereof), through which data can be routed between certain of the components.

The scanner also includes at least one processor 102. The processor 102 may be a microprocessor, mobile application processor, etc., known in the art (e.g., a Reduced Instruction Set Computer (RISC) from ARM Limited, the Krait CPU product-family, X86-based microprocessor available from the Intel Corporation including those in the Pentium, Xeon, Itanium, Celeron, Atom, Core i-series product families, etc.). The processor may also be a Digital Signal Processor (DSP) such the C6000 DSP category from Texas Instruments. FIG. 4 shows a second processor behind processor 102 to illustrate that the scanner may have plural processors, as well as plural core processors. Other components on the bus 100 may also include processors, such as DSP or microcontroller.

Processor architectures used in current scanner technology include, for example, ARM (which includes several architecture versions), Intel, and TI C6000 DSP. Processor speeds typically range from 400 MHz to 2+ Ghz. Some scanner devices employ ARM NEON technology, which provides a Single Instruction, Multiple Data (SIMD) extension for a class of ARM processors.

The processor 102 runs an operating system of the scanner, and runs application programs and, manages the various functions of the device. The processor 102 may include or be coupled to a read-only memory (ROM) (not shown), which stores an operating system (e.g., a "high-level" operating system, a "real-time" operating system, a mobile operating system, or the like or combination thereof) and other device firmware that runs on the scanner.

The scanner also includes a volatile memory 104 electrically coupled to bus 100 (also referred to as dynamic memory). The volatile memory 104 may include, for example, a type of random access memory (RAM). Although not shown, the scanner includes a memory controller that controls the flow of data to and from the volatile memory 104. Current scanner devices typically have around 500 MiB of dynamic memory, and provide a minimum of 8 KiB of stack memory for certain recognition units. For some embodiments of the watermark processor, which is implemented as an embedded system SDK, for example, it is recommended that the scanner have a minimum of 8 KiB stack memory for running the embedded system SDK.

The scanner also includes a storage memory 106 connected to the bus. The storage memory 106 typically includes one or more non-volatile semiconductor memory devices such as ROM, EPROM and EEPROM, NOR or NAND flash memory, or the like or combinations thereof, and may also include alternative storage devices, such as, for example, magnetic or optical disks. The storage memory 106 is used to store one or more items of software. Software can include system software, application software, middleware, one or more computer files (e.g., one or more data files, configuration files, library files, archive files, etc.), one or more software components, or the like or stack or other combination thereof.

Examples of system software include operating systems (e.g., including one or more high-level operating systems, real-time operating systems, mobile operating systems, or the like or combination thereof), one or more kernels, one or more device drivers, firmware, one or more utility programs (e.g., that help to analyze, configure, optimize, maintain, etc., one or more components of the scanner), and the like. Suitable operating systems for scanners include but are not limited to Windows (multiple versions), Linux, iOS, Quadros, and Android.

Compilers used to convert higher level software instructions into executable code for these devices include: Microsoft C/C++, GNU, ARM, and Clang/LLVM. Examples of compilers used for ARM architectures are RVDS 4.1+, DS-5, CodeSourcery, and Greenhills Software.

Also connected to the bus 100 is an imager interface 108. The imager interface 108 connects one or more one or more imagers 110 to bus 100. The imager interface supplies control signals to the imagers to capture frames and communicate them to other components on the bus. In some implementations, the imager interface also includes an image processing DSP that provides image processing functions, such as sampling and preparation of groups of pixel regions from the 2D sensor array (blocks, scanlines, etc.) for further image processing. The DSP in the imager interface may also execute other image pre-processing, recognition or optical code reading instructions on these pixels. The imager interface 108 also includes memory buffers for transferring image and image processing results to other components on the bus 100.

Though one imager 110 is shown in FIG. 4, the scanner may have additional imagers. Each imager is comprised of a digital image sensor (e.g., CMOS or CCD) or like camera having a two-dimensional array of pixels. The sensor may be a monochrome or color sensor (e.g., one that employs a Bayer arrangement), and operate in a rolling and/or global shutter mode. Examples of these imagers include model EV76C560 CMOS sensor offered by e2v Technologies PLC, Essex, England, and model MT9V022 sensor offered by On Semiconductor of Phoenix, Ariz. Each imager 110 captures an image of its view or views of a view volume of the scanner, as illuminated by an illumination source. The imager captures at least one view. Plural views (e.g., view1 112 and view2 114) are captured by a single imager in scanners where optical elements, such as mirrors and beam splitters are used to direct light reflected from different sides of an object in the view volume to the imager.

Also coupled to the bus 100 is an illumination driver 116 that controls and illumination sources 118. Typical scanners employ Light Emitting Diodes (LEDs) as illumination sources. In one typical configuration, red LEDs are paired with a monochrome camera. The illumination driver applies signals to the LEDs to turn them on in a controlled sequence (strobe them) in synchronization with capture by an imager or imagers. In another configuration, plural different color LEDs may also be used and strobed in a manner such that the imager(s) selectively capture images under illumination from different color LED or sets of LEDs. See, e.g., Patent Application Publication 2013-0329006, entitled COORDINATED ILLUMINATION AND IMAGE SIGNAL CAPTURE FOR ENHANCED SIGNAL DETECTION, and Ser. No. 14/836,878, entitled SENSOR-SYNCHRONIZED SPECTRALLY-STRUCTURED-LIGHT IMAGING (Now published as US 2016-0187199), which are hereby incorporated by reference. The latter captures images in plural different spectral bands beyond standard RGB color planes, enabling extraction of encoded information as well as object recognition based on pixel samples in more narrow spectral bands at, above and below the visible spectrum.

In another configuration, a broadband illumination source is flashed and image pixels in different bands, e.g., RGB, are captured with a color image sensor (e.g., such as one with a Bayer arrangement). The illumination driver may also strobe different sets of LED that are arranged to illuminate particular views within the view volume (e.g., so as to capture images of different sides of an object in the view volume).

A further extension of scanner capability is to include a RGB+D imager, which provides a depth measurement in addition to Red, Green and Blue samples per pixel. The depth sample enables use of object geometry to assist in product identification.

The scanner also includes at least one communications module 118, each comprised of circuitry to transmit and receive data through a wired or wireless link to another device or network. One example of a communication module is a connector that operates in conjunction with software or firmware on the scanner to function as a serial port (e.g., RS232), a Universal Serial Bus (USB) port, and an IR interface. Another example of a communication module in a scanner is a universal interface driver application specific integrated circuit (UIDA) that supports plural different host interface protocols, such as RS-232C, IBM46XX, or Keyboard Wedge interface. The scanner may also have communication modules to support other communication modes, such as USB, Ethernet, Bluetooth, Wifi, infrared (e.g., IrDa) or RFID communication.

Also connected to the bus 100 is a sensor interface module 122 communicatively coupled to one or more sensors 124. Some scanner configurations have a scale for weighing items, and other data capture sensors such as RFID or NFC readers or the like for reading codes from products, consumer devices, payment cards, etc.

The sensor interface module 130 may also optionally include cache or other local memory device (e.g., volatile memory, non-volatile memory or a combination thereof), DMA channels, one or more input buffers, one or more output buffers to store and communicate control and data signals to and from the sensor.

Finally, the scanner may be equipped with a variety of user input/output devices, connected to the bus 100 via a corresponding user I/O interface 126. Scanners, for example, provide user output in the form of a read indicator light or sound, and thus have an indicator light or display 128 and/or speaker 130. The scanner may also have a display and display controller connecting the display device to the bus 100. For I/O capability, the scanner has a touch screen for both display and user input.

Figure 5:
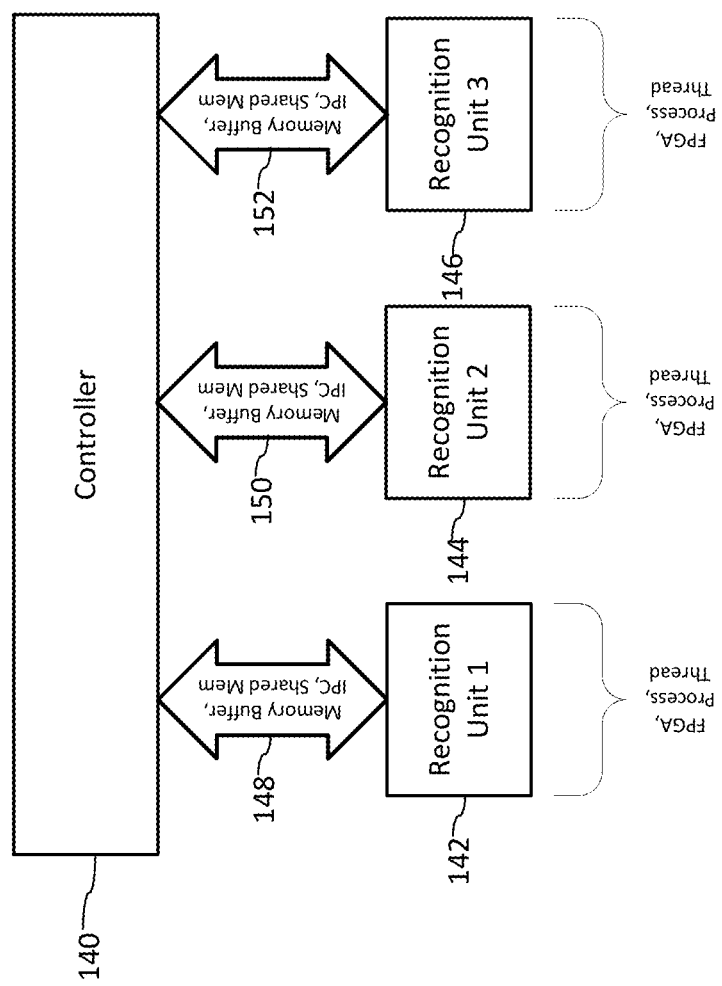
FIG. 5 is a diagram illustrating a processing architecture for controlling recognition units within a scanner.

FIG. 5 is a diagram illustrating a processing architecture for controlling recognition units within a scanner. The processing architecture comprises a controller and recognition units. Each of these elements is a logical processing module implemented as a set of instructions executing on a processor in the scanner, or implemented in an array of digital logic gates, such as a Field Programmable Gate Array (FPGA) or Application Specific Integrated Circuit (ASIC). Each of the modules may operate within a single component (such as a processor, FPGA or ASIC), within cores of a plural core processor, or within two or more components that are interconnected via the bus 100 or other interconnect between components in the scanner hardware of FIG. 4. The implementer may create the instructions of each module in a higher level programming language, such as C/C++ and then port them to the particular hardware components in the scanner architecture of choice.

In this example, we show a controller and three recognition units. There may be more or less of each in a given implementation. The controller 140 is responsible for sending recognition tasks to recognition units (142, 144 and 146), getting the results of those tasks, and then executing logic to determine the item code to be sent to the host POS system of the scanner. The controller module 140 communicates with the recognition units (142-146) via communication links 148, 150, 152. The manner in which the controller communicates with the recognition units depend on the implementation of each. To communicate with an FPGA, the controller communicates through a memory buffer, e.g., via the bus 100.

To communicate among software processes, the controller process employs inter-process communication (IPC). The particular form of IPC depends in part on the operating system executing in the scanner. For a Unix OS or Unix derivatives, IPC may be implemented with sockets. Windows based Operating Systems from Microsoft Corp. also provide an implementation of sockets for IPC.

Finally, controller and recognition units may be implemented within a single software process in which communication among software routines within the process is implemented with shared memory. Within a process, the software program of each recognition units may be executed serially and report its results back to the controller. Recognition units may also be executed as separate threads of execution. The operating system running in the scanner manages pre-emptive multi-tasking and multi-threading (if employed) for software processes and threads. The operating system also manages concurrent execution on processes on processors, in some scanners where more than one processor is available for the controller, recognition units, and other image processing.

A recognition unit executes instructions on an image block provided to it to recognize an object or objects in the image block and return a corresponding recognition result. For optical codes like barcodes and Digimarc Barcode data carriers, the recognition result comprises the digital payload extracted from the carrier, which may be formatted as a string of binary or M-ary symbols or converted to a higher level code such as a GTIN data structure in accordance with the GS1 specification for GTINs. Recognition units that perform optical code reading include, for example, optical code readers for 1-dimensional (1D) optical codes like UPC, EAN, Code 39, Code 128 (including GS1-128), stacked codes like DataBar stacked and PDF417, or 2-dimensional optical codes like a DataMatrix, QR code or MaxiCode.

Some scanners also have varying levels of object recognition capability, in which the recognition process entails feature extraction and classification or identification based on the extracted features. Some of these type of recognition processes provide attributes of an item or label, or a class of the product or label. Attributes of the item include color (e.g., color histogram) or geometry, such as position, shape, bounding region or other geometric attributes). The attributes may be further submitted to a classifier to classify an item type. The controller combines this information with other recognition results or sensor input to disambiguate plural codes detected from an object in the view volume.

Depending on processing power, memory and memory bandwidth constraints, the scanner may have more sophisticated object recognition capability that is able to match extracted features with a feature database in memory and identify a product based on satisfying match criteria. This technology is described further below.

Though we are primarily focused on image processing recognition, the recognition units may also operate on other sensed data. Examples include decoding of an RFID tag based on sensed RF signal input, and weight attributes from a scale.

Figure 6:
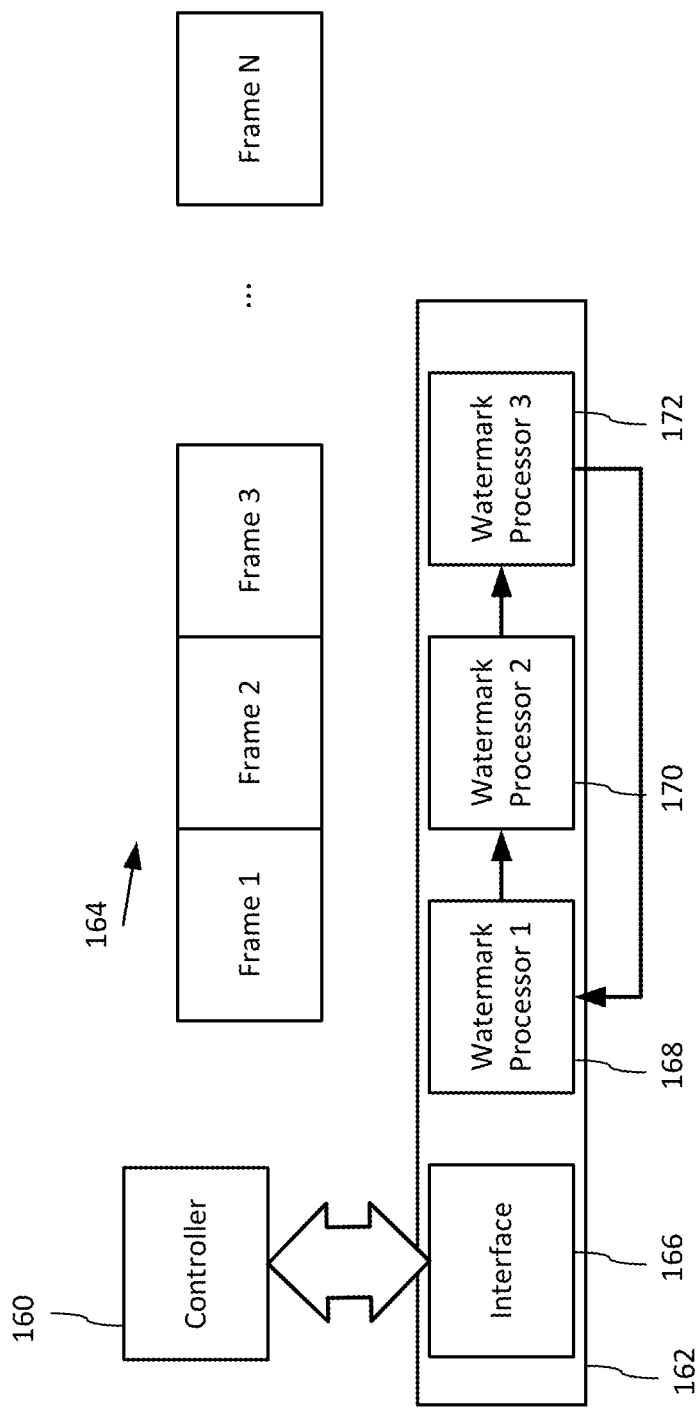
FIG. 6 is diagram illustrating software modules that operate on a sequence of image frames to detect and extract digital payloads from images of objects within the frames.

FIG. 6 is diagram illustrating a software modules 160, 162 that operate on a sequence of image frames 164 to detect and extract digital payloads from images of objects within the frames. Controller 160 is an example of a controller 140 in the architecture of FIG. 5. This diagram illustrates the interaction of a controller with one particular implementation of a recognition unit 162. In this instance, the controller 160 and recognition unit are software processes. In one embodiment, they execute on distinct processors within the scanner. For example, they execute either in the separate processors 102, 102a, or the controller executes in processor 102 and recognition unit executes in a processor within the imager interface 108 (e.g., DSP). In another embodiment, they execute within the same processor, e.g., processor 102, or within a DSP in the imager interface 108.

In still another embodiment, the controller executes in processor 102, and the instructions of the recognition unit are implemented within an FPGA or ASIC, which is part of another component, such as the imager interface, or a separate component on bus 100.

The software process of the recognition unit 162 performs a form of recognition that employs digital watermark decoding to detect and extract watermark payloads from encoded data tiles in the image frames 164. The term, "frame," refers to a group of pixels read from a 2D sensor array for a time period in which a 2D image is captured on the sensor array. Recall that the sensor may operate in rolling shutter or global shutter mode. In some implementations, selected rows of the sensor array are sampled during a capture period and stored in a memory buffer (e.g., in the imager interface), which is accessed by the recognition unit(s). In others, an entire frame of all pixels in the sensor array are sampled and stored in a frame buffer, which is then accessed by the recognition unit(s). The group of pixels sampled from a frame may include plural views of the viewing volume, or a part of the viewing volume.

The recognition unit 162 has the following sub-modules of instructions: interface 166 and watermark processors 168, 170, 172. The interface comprises software code for receiving calls from the controlling and returning recognition results from shared memory of the software process of the recognition unit 162. Watermark processors are instances of watermark decoders.

When an object moves into the view volume of the scanner, controller 160 invokes the recognition unit 162 on image frames containing the object. Via interface 166, the controller 160 calls the recognition unit 162, providing the frames 164 by supplying an address of or pointer to them in the memory of the scanner (image buffer in e.g., either volatile memory 104 or memory buffers in imager interface 108). It also provides other attributes, such as attributes of the view from which the frame originated.

The recognition unit proceeds to invoke a watermark processor 168-172 on frames in serial fashion. Watermark processors 1-3 operate on frames 1-3, and then process flow returns back to watermark processor 1 for frame 4, and so on. This is just one example of process flow in a serial process flow implementation. Alternatively, watermark processors may be executed concurrently within a process as threads, or executed as separate software processes, each with an interface and watermark processor instance.

The recognition unit 162 provides the extracted payload results, if any, for each frame via communication link as described above. The controller analyzes the results from the recognition unit and other recognition units and determines when and what to report to the POS terminal. Each watermark processor records in shared memory of the recognition unit 162 its result for analyzing the image block assigned to it. This result is a no detect, a successful read result along with decoded payload, or payloads (in the event that distinct payloads are detected within a frame). Optionally the watermark processor provides orientation parameters of the decoded payload, which provide geometric orientation and/or position of the tile or tiles from which the payload is decoded.

Figure 7A:
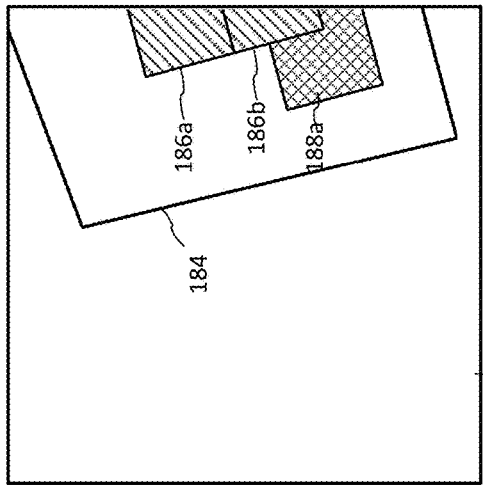
FIGS. 7A and 7B illustrate image portions of an object in different frames captured from a field of view of a scanner's imager.
Figure 7B:
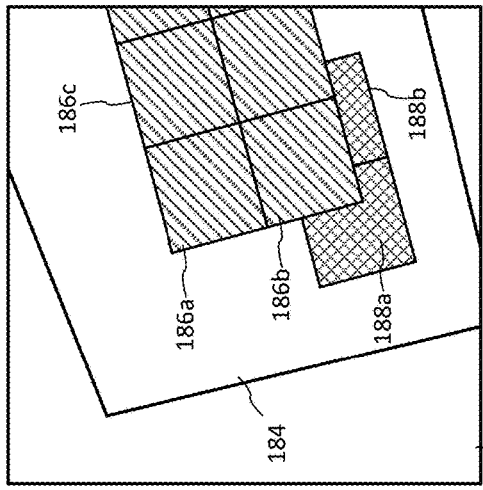

FIGS. 7A and 7B illustrate image portions 180, 182 in different frames captured from a field of view of a scanner's imager. An object 184 is moving through this field of view in these frames. Here, we use the phrase, "image portion," to reflect that the image portion of a frame is not necessarily co-extensive with the entire pixel array of an imager. As noted, an imager may capture plural views of the object 184 per frame, and the image portion may correspond to one particular view of plural different views captured by the image sensor array for a frame. Alternatively, it may encompass plural views imaged within a frame. Also, frames from different imagers may be composited, in which case, the image portion may include a portion of frames composited from different imagers. Nevertheless, FIG. 7A depicts an image block from a frame at a first capture time, and FIG. 7B represents an image block from a second, later capture time.

For sake of illustration, we use an example where the imager has a frame capture rate of 100 frames per second. Thus, a new frame is available for sampling as fast as every 10 ms. The rate at which the controller provides frames or portions of frames to each recognition unit may not be as high as the frame rate. Thus, the frames illustrated here need not be strictly adjacent in a video sequence from the sensor, but are within a time period in which an object 184 moves through the field of view of the scanner. The object movement may be from a checker swiping the object 184 through a field of view of the scanner or positioning a hand held scanner to image the object, or from a mechanical mechanism, such as a conveyor moving an object through a view volume of a scanner. Image portion 180 at frame time, T1, includes an image captured of at least a first part of object 184. This object has encoded data tiles having a first payload 186a, 186b, and encoded data tile 188a having a second payload. Image block 182, at a later frame time, T2, depicts that the object 184 has moved further within the field of view of the scanner. At T2, more tiles are captured, such as 186c having the same payload as 186a and 186b, and 188b having the same payload as 188a.

FIGS. 7A and 7B illustrate the problem outlined above for conflicting codes on objects. In this scenario, the recognition unit may detect a first code in 188a and another code in 186a or none of the codes in 186 from frame at T1. However, the reverse may happen for the frame at T2, as more of the tiles of 186 are visible to the scanner than 188. The recognition unit is more likely to detect 186 at T2. The code in 188 is an example of an inner barcode. It is only partially obscured by the label or overwrap on which the code in 186 resides. Tiles 188a-b carry an "inner barcode," whereas tiles 186a-c contain an "outer barcode," using the terminology introduced earlier.

This sequence illustrates one scenario where the different codes created for family packs and price change labels create scanner conflict. The encoded tiles 188a-b correspond to packaging of an individual item in a family pack or the label bearing the GTIN of a product, before a price change. The encoded tiles 186a-c correspond to packaging of the family pack, such as a partial over-wrap or carrier. Encoded tiles 186a-c alternatively correspond to a price change label. The sequence of detection is likely to be as shown in FIG. 2, where the inner barcode of 188 is detected at T1 and then the outer barcode is detected at T2. This sequence of detection may not always happen, but in cases where different codes are detected from a package either within a frame, or over different frames, there is a need for code conflict resolution.

Figure 8A:
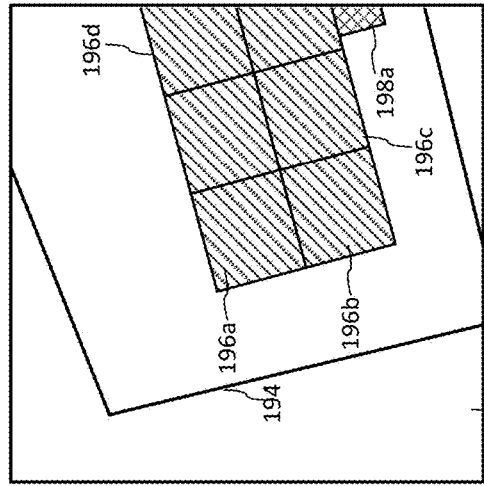
FIGS. 8A and 8B illustrate another example of image portions of an object in different frames captured from a field of view of a scanner's imager.
Figure 8B:
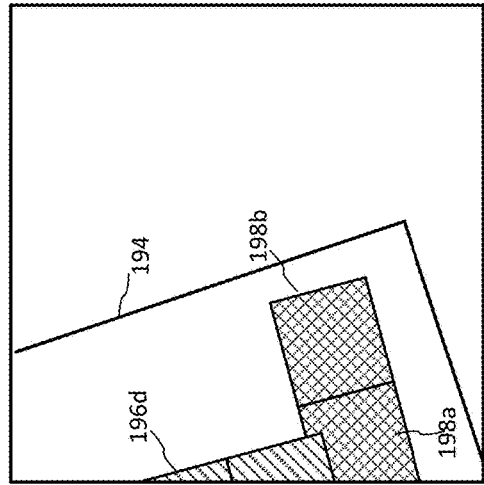

FIGS. 8A and 8B illustrate another example of image portions 190, 192 in different frames captured from a field of view of a scanner's imager. As the object 194 moves through the field of view, an outer barcode is likely to be detected first, but later, the inner barcode is likely to be detected. In this scenario, an outer barcode is encoded in tiles 196a-d, and an inner barcode in tiles 198a-b. For family packs, the outer barcode is encoded in tiles 196a-d on the package of the overwrap, but the overwrap does not completely obscure the inner barcode, which is a barcode encoded in tiles 198a-b on an individual item or items within the family pack. For price change labels, the price change is encoded in 196a-d, e.g., on a label affixed to the package 194 over the original packaging. The original packaging, however, retains encoding of the original item's GTIN in tiles 198a-b. The sequence of detection of outer than inner barcode of FIG. 3 is likely to happen in this case. At time T1, a recognition unit is likely to detect the payload of tiles 196a-d, and likely not 198a. At time T2, the recognition unit is likely to detect the payload of tiles 198a-b. This scenario poses a conflict if the scanner were to report the GTIN of the inner barcode separately from the family pack. Further, in some price change label scenarios, the scanner needs to detect that it should not report the original GTIN, as this would not reflect the price change correctly.

Figure 9:
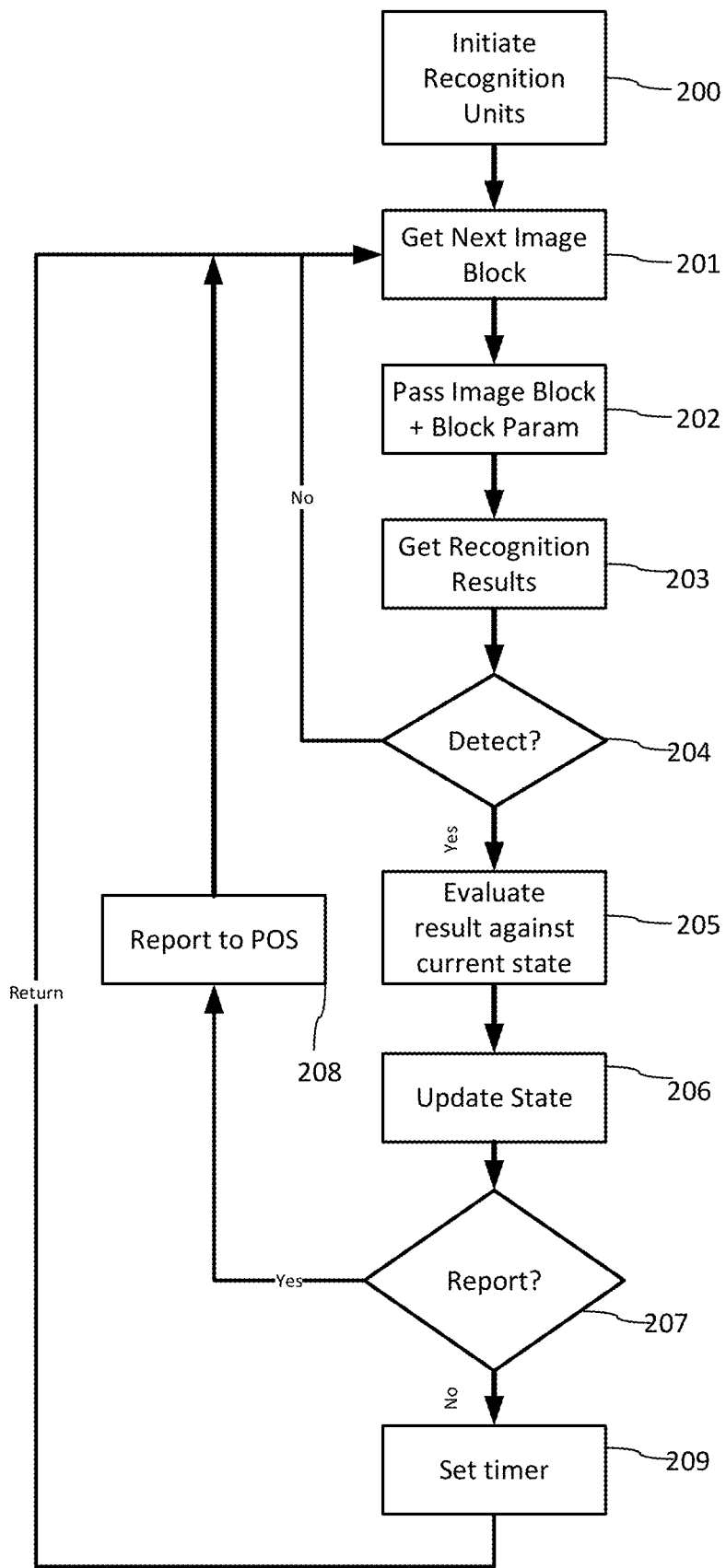
FIG. 9 is a flow diagram of a controller process that resolves product identification conflicts.

FIG. 9 is a flow diagram of a controller process that resolves these potential code conflicts. Preferably, this control logic is implemented within the controller 140 of FIG. 5. However, it may also be distributed between the controller 140 and one or more recognition units (e.g., 142, 144, 146). In particular, a recognition unit may implement control logic for resolving conflicts among codes that it detects during scanning operation, and report a subset of codes to a controller 140 for which conflicts have been resolved. The controller, in turn, receives recognition results from plural different recognition units and executes control logic to resolve conflicts among the recognition results from these recognition units.

One particular software architecture in which this control logic is implemented is the architecture illustrated in FIG. 6. In this implementation, the control logic is implemented as software instructions within a controller software process 160 executing on a processor (102, 102a or 108) of the scanner. The recognition unit 162 is a software process executed on that processor or different processor within the scanner.

As shown in step 200, the controller begins by initiating the recognition units. The recognition units (e.g., 142-146) are launched as instances of software processes executing on a processor within the scanner.

The controller issues instructions to the imager 110 via the imager interface and the illumination driver 116 to coordinate image capture and illumination as objects are scanned. The imaging interface 108 captures image data from the image 110 for a frame, buffers it in a RAM memory and signals the controller that new image block is available. This RAM memory may be within the interface 108 or in RAM memory 104. In steps 201-202, the controller gets an address of an image block in this RAM memory and passes the address to a recognition unit, along with additional attributes of that image block useful in assisting recognition operations (such as the view or camera that the image block came from, its geometric state (e.g., orientation of the view), frame identifier, and the like). In response, the recognition unit proceeds to obtain and perform recognition operations on the image block. For decoding of Digimarc Barcode data carriers repeated in contiguous tiles, a watermark processor executes decoder operations on the image block to search for an encoded data carrier and extract its payload from one or more of these encoded tiles, if detected. Plural instances of watermark processors may be assigned to process image blocks of different frames, as shown in FIG. 6.

The controller gets recognition results from the recognition units as shown in step 203. The controller queries a recognition unit to get its recognition result. It then evaluates the result to determine whether it has successfully recognized an object and has provided its item identifier (e.g. a GTIN, price code identifier or like item identifier), as shown in decision block 204. If not, it passes the next image block to the recognition unit (back to 201-202).

If the controller has obtained an item identifier, it evaluates the identifier against other identifiers obtained from the frame and prior frames during a pending time out period in step 205. This evaluation includes a comparison of the detected identifier with other identifiers from the same frame or prior frame stored in a state data structure.

If it is a new identifier, it is stored in a state data structure in shared memory of the controller process and analyzed further to determine whether to report it or initiate a waiting period to report it. If it has identified the identifier as a duplicate identifier with another identifier in a pending duplicate time out period, it is rejected as a duplicate.

For the evaluation executed in step 205, the controller retains state information for identifiers. Upon detection of a new identifier, the controller checks whether it is flagged, or has otherwise been detected as a family pack, family pack member or price change label. A family pack or family pack member is signaled via a flag decoded from the data carrier encoded on the object. Likewise, a price change label is similarly indicated by a flag. Alternative means of detecting family packs, family pack member items, and price change labels may be used in place of the flag or in addition to a flag, as described in this document (e.g., by label geometry, color, recognized image feature set or label template, etc.).

The detection of a family pack causes the controller to update the state by storing the family pack identifier in a state data structure and initiating a waiting period. The family pack identifier is queued for reporting at this point, as there is no need to wait to report it. Instead, this waiting period is used to prevent reporting an identifier of a member of the family pack for detections during waiting period initiated upon detection of the family pack. The waiting period is implemented using a timer as explained below. A duplicate time out period has a different objective from that of a waiting period to resolve a conflict. As such, it may be preferred to instantiate separate timers for duplicate and conflict rejection.

The detection of a new family pack member causes the controller to check whether a family pack identifier with a pending waiting period is in a state data structure. The pending waiting period is indicated by the timer for the waiting period not being in time out state when queried for an update. If family pack is in a waiting period, the family pack member is not reported. If a family pack is not in a waiting period, the controller updates the state data structure by storing the family pack member's identifier and initiating a waiting period for it. This family pack member waiting period is used to instruct the controller to wait to determine whether a family pack identifier is detected in the waiting period. It may also be used for duplicate rejection. If a family pack identifier is detected in this family pack member waiting period, the family pack identifier is stored in a state data structure and is queued for reporting (there is no need to wait on reporting). Additionally, the family pack member is stored in a state data structure for duplicate rejection, and a family pack waiting period is initiated for the family pack identifier by setting a timer for a family pack waiting period.

There are at least two types of price change labels: new fixed price and discount labels. When the controller finds a detection result with a new fixed price flag set, it stores the new fixed price code and queues it for reporting. From a reporting perspective, the controller reports the new fixed price instead of the original product identifier (GTIN) decoded from the same object. The scanner determines whether an identifier is from the same object by proximity in detection time or detection location of the price change label relative to the original product identifier (GTIN). Proximity in detection time is implemented based on a waiting period.

In an implementation where new fixed price labels are employed, a waiting period is imposed for new identifiers detected because of the possibility that detection of a new fixed price label may replace the GTIN that the controller reports to the POS terminal. When a new product identifier is detected, and there is no waiting period for a new fixed price code in a state data structure, the new identifier is retained and a waiting period is initiated to determine whether a fixed price label is detected in that ensuing waiting period. If a new fixed price code is detected first before the original product identifier on the object, meaning that no product identifier is in a waiting period state in the state data structure, the new fixed price code is queued for reporting. Subsequent product identifiers in the waiting period are not reported, but may be stored for duplicate rejection.

For a detected discount code, the controller stores the discount code in a state data structure and queues it for reporting. The scanner logic determines whether a product identifier is detected from the same object as noted in the previous case, e.g., by proximity in detection time and/or position in frame(s) relative to the discount label. If a product identifier from the same object is in the state data structure under its waiting period, the detected discount code is reported along with it. The discount code is stored for duplicate rejection, but is reported only once. If a discount is detected first, with no product identifier in a pending waiting period, the controller stores it in the state data structure and initiates a waiting period. It is reported if a new product identifier is detected in its waiting period. Since the discount should be associated with a product identifier, the controller may flag the POS terminal to have the checker scan or otherwise enter the product identifier of the product to which the discount code applies.

In step 206, the controller updates the state data structure with the identifier and status of an identifier (including product or price change codes), including state associated with family pack or price change detection results. It also calls a timer instance, if one has been initiated, to get its count and update the status of the timer as timed out, or still pending. It may also retain other information helpful in resolving conflict among detected items. This information may include a frame identifier or time code to indicate where an identifier originated from within a frame or a time of the frame in which it was detected. This information may also include position information, such orientation parameters and/or spatial location within a frame from which the identifier was extracted. In cases where different identifiers are detected within a frame, or within frames within a waiting period, the positional information may be used to determine that identifiers are from items that are to be priced separately, and as such, both reported to the POS. For example, if the identifiers originate from different frame locations and have tile orientation that is inconsistent, then they are candidates of being from separate objects, and handled as such by the controller.

In decision step 207, the controller determines whether to report the identifier or identifiers in the state data structure. The decision is based on state of the identifiers in the data structure and the state of the timer used to track a waiting period that has been initiated. The controller reports an identifier, including price change codes, for which a waiting period has not been imposed, or the waiting period to report has timed out. Time out periods used only for duplicate rejection do not require a waiting period for reporting. However, potential conflicts arising from family pack or price changes may require a waiting period as described above. The controller determines whether an identifier is in a waiting period by checking the state data structure to check whether the timer instance for a waiting period has timed out. In some cases, another detection will trigger a report, prior to a timer getting to a time out state. In this case, the controller has updated the state data structure to signal that an identifier is in a state to be reported, or ignored. If it determines to report, the controller transmits the identifier(s) to the POS terminal via the scanner's communication interface as shown in block 208.

In the next step 209, the controller sets up a timer for a waiting period, if necessary, for this pass through the controller process. The timer may be implemented with a soft timer, a software process such as a C++ timer object, which in turn, interfaces with a timer interrupt service available in the scanner's operating system. In this approach, the timer creates a timer instance for a waiting period. The timer instance invokes the timer interrupt service to update its count. The time interrupt services exposes a counter in the scanner hardware, e.g., as part of the ARM or other processor sub-system in the scanner. For flags that signal the start of a waiting period, such as a family pack or member of family pack, a new timer is initiated for that family pack related waiting period. The same is true for price change related waiting periods.

FIG. 9 depicts an example of a sequence of operations of a controller implementation. The sequence of operations may vary from the one depicted here. For example the timer may be set within the set of instructions that execute the update to the state of 206.

As noted, code conflict logic may be implemented within each recognition unit, and at the level of the controller. Conflict logic within a recognition unit is employed to resolve conflict among codes of the same type detected by the recognition unit. For example, in the case where plural conflicting codes of the same type are present on a package, the recognition unit employs code conflict logic to prevent reporting an erroneous code to the controller, and ultimately, to prevent the scanner from reporting an improper code to the POS system.

In one embodiment, the recognition unit writes its detection results to a data structure and returns the data structure (or pointer to it) when the controller queries it for detection results. The recognition unit records the state of detection results in the data structure, including whether a detected identifier is in a waiting period and whether a detected identifier is in a potentially conflicted status with another identifier. When plural different codes of the same symbology and type are detected within a frame, they are recorded as potentially conflicting. This may occur where there are two different GTINs without a family pack or price code relationship to justify the existence of the different GTINs. A waiting period is initiated for each code. For subsequent codes detected within the waiting period, the recognition unit updates the data structure. The recognition unit may be able to resolve the conflict based on detection results within the waiting period that confirm that one identifier should be given priority over another. For example, subsequent detection of one of the identifiers in subsequent image frames of a package within the waiting period may be sufficient to confirm that one identifier has priority and should be reported as such through the state data structure. Alternatively, the conflict may not be resolved, and instead, the recognition unit reports potentially conflicting identifiers on a package to the controller via a pointer to the data structure.

In response, the controller either resolves the conflict based on detection results from another recognition unit and reports the highest priority identifier or reports an error to the POS system. For example, a GTIN in a barcode of one type reported from one recognition unit may agree with a GTIN in a different symbology reported from another recognition unit. For results within a waiting period, the controller compares the detection results from different recognition units and determines, based on matching the GTINs from different symbologies, that a conflicting GTIN can be excluded and the matching GTIN given priority. The controller then reports the higher priority GTIN. Alternatively, if a conflict persists or is not resolved, the controller signals an error to the POS system and prompts a re-scan, or manual entry. The re-scan may be switched to a presentment mode rather than a scan and pass mode so that the user can present the correct code for scanning.

This approach for integrating recognition units in scanners enables the recognition units to be updated over time while maintaining the same interface with the scanner and the interface to its controller. Specifically, recognition units can become more sophisticated in detection performance, detection result and state reporting, and conflict logic. These updates are reflected in updates to the contents of the data structure, which provide more detail of the context of the detection of each identifier (e.g., location, time of detect, number of detects, waiting period state) as well as recommended reporting logic (e.g., reporting an instruction to the controller to hold for waiting period, resolve conflict between codes A, B, etc., or seek to confirm detection result with result of another recognition unit). The scanner may be updated on a different schedule without concern of becoming incompatible with the recognition unit, as the data structure is configured to include a detection result that is backward compatible. An older version of a controller continues to interpret simpler results as before, e.g., report GTIN, wait, or error. In contrast, a new version of the controller is preferably updated to interpret error or wait states in the extended data structure, as an instruction to read and resolve potential code conflicts identified in the extended data structure.

Preferably, the recognition unit updates are provided with helper source code that provide scanner manufacturers guidance on how to exploit the additional detection result data and code conflict logic implemented by the recognition unit and reported in the extended data structure it returns.

Signal Encoder and Decoder

Figure 10:
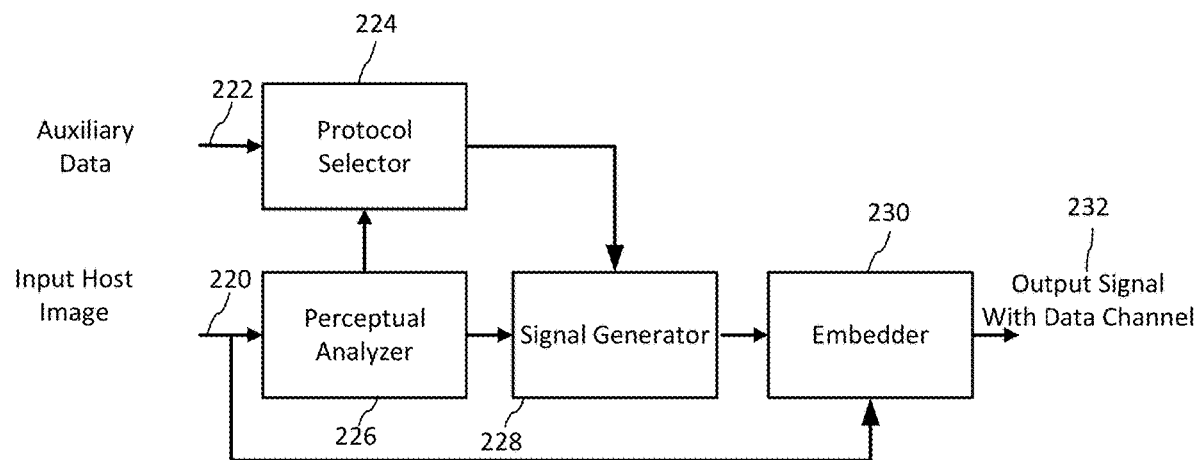
FIG. 10 is a block diagram of a signal encoder for encoding a digital payload signal into an image signal.
Figure 11:
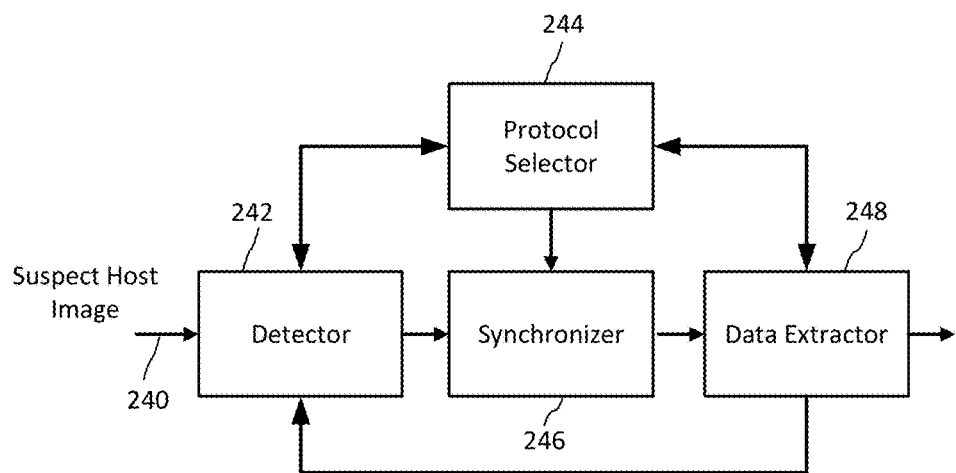
FIG. 11 is a block diagram of a compatible signal decoder for extracting the digital payload signal from an image signal.

FIG. 10 is a block diagram of a signal encoder for encoding a digital payload signal into an image signal. FIG. 11 is a block diagram of a compatible signal decoder for extracting the digital payload signal from an image signal.

While the signal encoder and decoder may be used for communicating a data channel for many applications, the objective for use in physical objects is robust signal communication through images formed on and captured from these objects. Signal encoders and decoders, like those in the Digimarc Barcode Platform from Digimarc Corporation, communicate auxiliary data in a data carrier within image content. Encoding and decoding is applied digitally, yet the signal survives digital to analog transformation and analog to digital transformation. For example, the encoder generates a modulated image that is converted to a rendered form, such as a printed image. Prior to decoding, a receiving device has an imager to capture the modulated signal, convert it to an electric signal, which is digitized and then processed by the decoder.

Inputs to the signal encoder include a host image 220 and auxiliary data payload 222. The objectives of the encoder include encoding a robust signal with desired payload capacity per unit of host signal (e.g., the spatial area of a two-dimensional tile), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color). See, e.g., U.S. patent application Ser. No. 14/725,399, entitled SPARSE MODULATION FOR ROBUST SIGNALING AND SYNCHRONIZATION (now published as US 2016-0275639), incorporated herein by reference.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and synchronization method and signals.

The protocol defines the manner in which the signal is structured and encoded for robustness, perceptual quality or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 156 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., our work on visibility and color models used in perceptual analysis in our U.S. application Ser. No. 14/616,686 (Now published as US 2015-0156369), and Ser. No. 14/588,636 (now published as US 2015-0187039), Patent Application Publication 20100150434, and U.S. Pat. Nos. 7,352,878 and 9,449,357, which are hereby incorporated by reference.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator produces a data signal with data elements that are mapped to embedding locations in a tile. These data elements are modulated onto the host image at the embedding locations. A tile is a pattern of embedding locations. The tile derives its name from the way in which it is repeated in contiguous blocks of a host signal, but it need not be arranged this way. In image-based encoders, we use tiles in the form of a two dimensional array (e.g., 128 by 128, 256 by 256, 512 by 512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. Below, we highlight a few examples. See, e.g., U.S. application Ser. No. 13/975,919. See also, U.S. Pat. No. 9,565,335, U.S. application Ser. No. 14/588,636, entitled FULL-COLOR VISIBILITY MODEL USING CSF WHICH VARIES SPATIALLY WITH LOCAL LUMINANCE (published as 2015-0187039), filed Jan. 2, 2015, and U.S. Provisional application 62/152,745, entitled DATA HIDING USING EQUAL VISIBILITY EMBEDDING FOR COLOR DESIGNS, filed Apr. 24, 2015, which are hereby incorporated by reference.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., our U.S. application Ser. Nos. 14/616,686, and 14/588,636, Patent Application Publication 20100150434, and U.S. Pat. Nos. 7,352,878 and 9,449,357, already incorporated herein.

The embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., U.S. application Ser. Nos. 14/616,686, and 14/588,636 and U.S. Pat. No. 9,449,357 for image related processing.

This modulated host is then output as an output image signal 232, with a data channel encoded in it. The operation of combining also may occur in the analog realm where the data signal is transformed to a rendered form, such as a layer of ink or coating applied by a commercial press to substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference, and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the embedder signal typically incurs various forms of distortion through its distribution or use. For printed objects, this distortion occurs through rendering an image with the encoded signal in the printing process, and subsequent scanning back to a digital image via a camera or like image sensor.

Turning to FIG. 11, the signal decoder receives an encoded host signal 240 and operates on it with one or more processing stages to detect a data signal, synchronize it, and extract data. This signal decoder corresponds to a type of recognition unit in FIG. 5 and watermark processor in FIG. 6.

The decoder is paired with an input device in which a sensor captures an analog form of the signal and an analog to digital converter converts it to a digital form for digital signal processing. Though aspects of the decoder may be implemented as analog components, e.g., such as preprocessing filters that seek to isolate or amplify the data channel relative to noise, much of the decoder is implemented as digital signal processing modules that implement the signal processing operations within a scanner. As noted, these modules are implemented as software instructions executed within the scanner, an FPGA, or ASIC.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 12:
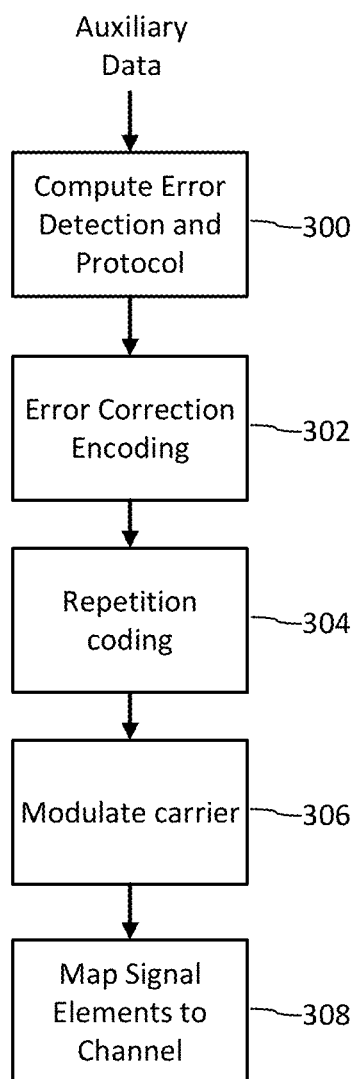
FIG. 12 is a flow diagram illustrating operations of a signal generator.

FIG. 12 is a flow diagram illustrating operations of a signal generator. Each of the blocks in the diagram depict processing modules that transform the input auxiliary data (e.g., GTIN or other item identifier plus flags) into a digital payload data signal structure. For a given protocol, each block provides one or more processing stage options selected according to the protocol. In processing module 300, the auxiliary data payload is processed to compute error detection bits, e.g., such as a Cyclic Redundancy Check, Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (⅓ rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder must be able to extract estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in our previously cited U.S. Pat. Nos. 6,614,914, and 5,862,260.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference.

Our US Publication 20120078989, which is hereby incorporated by reference, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, and U.S. application Ser. No. 14/724,729, which are hereby incorporated by reference.

Signal Embedding in Host

Figure 13:
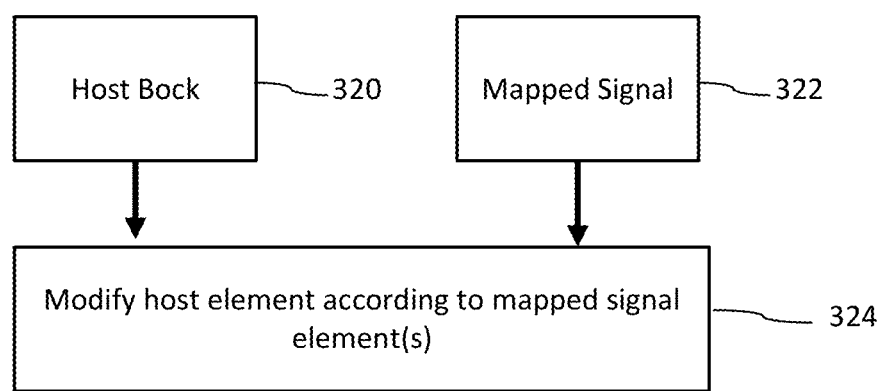
FIG. 13 is a diagram illustrating embedding of an auxiliary signal into host image signal.

FIG. 13 is a diagram illustrating embedding of an auxiliary signal into host signal. As shown, the inputs are a host signal block (e.g., blocks of a host digital image) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added, or added separately with separate mask coefficients to control the signal amplitude independently.

Applying the method of FIG. 12, the product or label identifier (e.g., in GTIN format) and additional flag or flags used by control logic are formatted into a binary sequence, which is encoded and mapped to the embedding locations of a tile. For sake of illustration, we describe an implementation of a tile having 256 by 256 embedding locations, where the embedding locations correspond to spatial domain embedding locations within an image. In particular, the spatial locations correspond to pixel samples at a configurable spatial resolution, such as 100 or 300 DPI. In this example, we will explain the case where the spatial resolution of the embedded signal is 300 DPI, for an embodiment where the resulting image with encode data is printed on a package or label material, such as a paper, plastic or like substrate. The payload is repeated in contiguous tiles each comprised of 256 by 256 of embedding locations. With these embedding parameters, an instance of the payload is encoded in each tile, occupying a block of host image of about 1.28 by 1.28 inches. These parameters are selected to provide a printed version of the image on paper or other substrate. At this size, the tile can be redundantly encoded in several contiguous tiles, providing added robustness. An alternative to achieving desired payload capacity is to encode a portion of the payload in smaller tiles, e.g., 128 by 128, and use a protocol indicator to specify the portion of the payload conveyed in each 128 by 128 tile. Erasure codes may be used to convey different payload components per tile and then assemble the components in the decoder, as elaborated upon below.

Following the construction of the payload, error correction coding is applied to the binary sequence. This implementation applies a convolutional coder at rate 1/4, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate 1/3 and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in Ser. No. 14/724,729, incorporated above. In the latter, the tile size may be increased to accommodate the differential encoding of each encoded bit in a pattern of differential encoded bit cells, where the bit cells corresponding to embedding locations at a target resolution (e.g., 300 DPI).

Our patent application Ser. No. 14/725,399, incorporated above, describes methods for inserting auxiliary signals in areas of package and label designs that have little host image variability. These methods are particularly useful for labels, including price change labels and fresh food labels. These signal encoding methods may be ported to the printing sub-system in scales used within fresh food, deli and meat departments to encode GTINs and control flags for variable weight items in the image of a label, which is then printed by the printer sub-system (typically a thermal printer) on the label and affixed to an item.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other tile size, e.g., 128 by 128) at target embedding resolution.

Various detailed examples of encoding protocols and processing stages of these protocols are provided in our prior work, such as our U.S. Pat. Nos. 6,614,914, 5,862,260, and 6,674,876, which are hereby incorporated by reference, and US Patent Publications 20100150434 and Ser. No. 14/725, 399, previously incorporated. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits output from an implementation of stage 304 of FIG. 5. These bits are modulated onto a pseudo-random carrier to produce watermark signal elements (block 306 of FIG. 12), which in turn, are assigned to the pseudorandom embedding locations within the sub-blocks (block 308 of FIG. 12). An embedder module modulates this signal onto a host signal by increasing or decreasing host signal values at these locations for each error correction coded bit according to the values of the corresponding elements of the modulated carrier signal for that bit.

Figure 14:
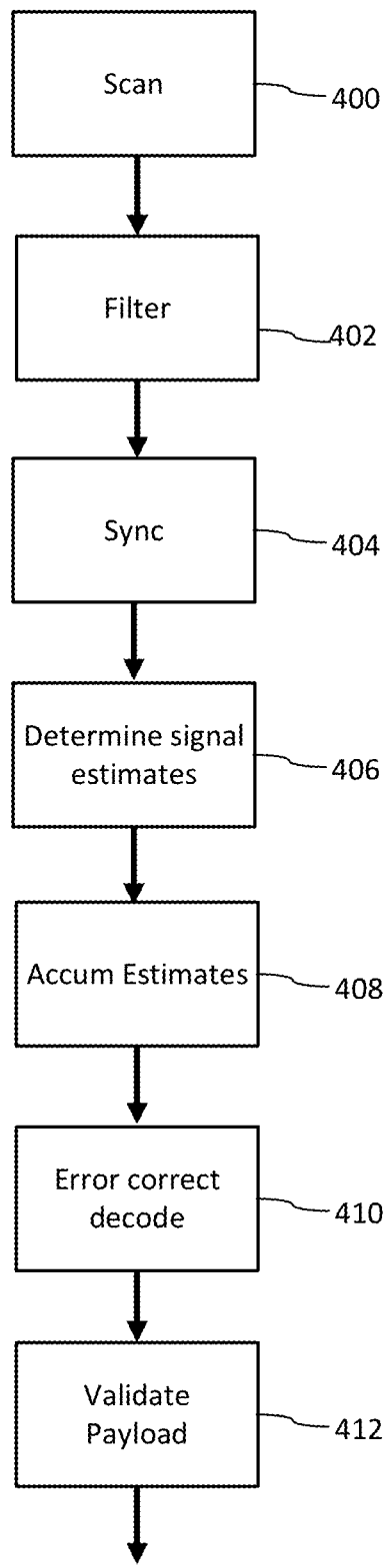
FIG. 14 is a flow diagram illustrating a method for decoding a payload signal from a host image signal.

FIG. 14 is a flow diagram illustrating a method for decoding a payload signal from a host image signal. This method is a particular embodiment of a recognition unit of FIG. 5, and a watermark processor of FIG. 6. Implementations of recognition unit and watermark processors available from Digimarc Corporation include:

Digimarc Mobile Software Development Kit; and
Digimarc Embedded Systems SDK.

The Embedded Systems SDK is the one typically integrated into scanner hardware.

Corresponding encoder embodiments available from Digimarc Corporation include:

Digimarc Barcode SDKs
Digimarc Barcode Plugin

Returning to FIG. 14, the frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object with encoded data is being scanned. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

For more on block selection, please see co-pending U.S. application Ser. No. 14/332,739, entitled FEATURE-BASED WATERMARK LOCALIZATION IN DIGITAL CAPTURE SYSTEMS (published as 20150030201), which is hereby incorporated by reference.

Please also see U.S. application Ser. No. 15/176,498, entitled IMAGE BLOCK SELECTION FOR EFFICIENT TIME-LIMITED DECODING (published as 20160364623), which is hereby incorporated by reference, for more on block selection where processing is time is more limited.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., 20100150434 for more on color channel encoding and decoding. For an image captured under red illumination by a monochrome scanner, the decoding process operates on this "red" channel sensed by the scanner. Some scanners may pulse LEDs of different color to obtain plural color or spectral samples per pixel as described in our Patent Application Publication 2013-0329006, entitled COORDINATED ILLUMINATION AND IMAGE SIGNAL CAPTURE FOR ENHANCED SIGNAL DETECTION, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614, 914, 20120078989, which are hereby incorporated by reference.

For more on filters, also see U.S. Pat. No. 7,076,082, which is hereby incorporated by reference. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions.

Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may employ a log polar method as detailed in U.S. Pat. No. 6,614,914 or least squares approach of 20120078989 to recover rotation and scale of a synchronization signal comprised of peaks in the Fourier domain. To recover translation, the phase correlation method of U.S. Pat. No. 6,614,914 is used, or phase estimation and phase deviation methods of 20120078989 are used.

Alternative methods perform synchronization on an implicit synchronization signal, e.g., as detailed in Ser. No. 14/724,729.

Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412). The check sum matches the one in the encoder, of course. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

Recognition Unit Employing Image Recognition

The scanner may also include a recognition unit that implements an image recognition method for identifying a product in a store's inventory as well as product labels, such as price change labels. In such a system, reference image feature sets of each product are stored in a database of the scanner's memory and linked to an item identifier for a product and/or particular label (e.g., price change label). The recognition unit extracts corresponding features from an image frame and matches them against the reference feature sets to detect a likely match. If the match criteria are satisfied, the recognition unit returns an item identifier associated with the match to the controller. The recognition unit may also return spatial information, such as position, bounding box, shape or other geometric parameters for a recognized item to enable the controller to detect whether a code from another recognition unit is from the same object.

One form of recognition system is an image fingerprint-based system. SIFT, SURF, ORB and CONGAS are some of the most popular algorithms. SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv:0804.4457, 2008.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are invariant to image scale, rotation and affine transformation. They are also robust to changes in illumination, noise, and some changes in viewpoint. In addition to these properties, they are distinctive, relatively easy to extract, allow for correct object identification with low probability of mismatch and are straight-forward to match against a (large) database of local features. Object description by set of SIFT features is also robust to partial occlusion; as few as 3 SIFT features from an object can be enough to compute location and pose.

The technique starts by identifying local image features—termed keypoints—in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient are calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with $\sigma$ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints at different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with a 1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25%—to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure, suitable for implementation in a next generation cell phone, is Bonato et al, "Parallel Hardware Architecture for Scale and Rotation Invariant Feature Detection," IEEE Trans on Circuits and Systems for Video Tech, Vol. 18, No. 12, 2008.

An alternative hardware architecture for executing SIFT techniques is detailed in Se et al, "Vision Based Modeling and Localization for Planetary Exploration Rovers," Proc. of Int. Astronautical Congress (IAC), October, 2004.

While SIFT is a well-known technique for generating robust local descriptors, there are others. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005) and SURF (c.f., Bay et al, SURF: Speeded Up Robust Features," Eur. Conf. on Computer Vision (1), pp. 404-417, 2006; Chen et al, "Efficient Extraction of Robust Image Features on Mobile Devices," Proc. of the 6.sup.th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008).

ORB refers to Oriented Fast and Rotated BRIEF, a fast local robust feature detector. For information about it, please see, Ethan Rublee, Vincent Rabaud, Kurt Konolige, Gary Bradski "ORB: an efficient alternative to SIFT or SURF", Computer Vision (ICCV), 2011 IEEE International Conference on. IEEE, 2011.

Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision—ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

In our related work, we describe methods for 3D object recognition based on capture of 2D images. See assignee's US Application Publication 2015-0016712, METHODS FOR OBJECT RECOGNITION AND RELATED ARRANGEMENTS, which is hereby incorporated by reference.

As alternatives, several other object recognition schemes are documented in published papers, and are incorporated by reference herein. The object recognition techniques in the following can be adapted for identifying products in a store's inventory:

Fei-Fei et al, A Bayesian Hierarchical Model for Learning Natural Scene Categories, IEEE Conference on Computer Vision and Pattern Recognition, 2005;

Ohbuchi, et al, Distance Metric Learning and Feature Combination for Shape-Based 3D Model Retrieval, Poster Presentation, Proc. of the ACM workshop on 3D Object Retrieval, 2010.

Lian, et al, Visual similarity based 3D shape retrieval using bag-of-features, IEEE Shape Modeling International Conference 2010; and Ohbuchi, et al, Accelerating bag-of-features SIFT algorithm for 3d model retrieval, Proc. SAMT 2008 Workshop on Semantic 3D Media; which are all hereby incorporated by reference.

Additional Embodiments

In this section, we describe additional embodiments of detection and resolution of code conflicts in a scanner, e.g., at retail checkout. These embodiments address conflicts between codes on an object detected by a first type of recognition unit (namely, an instance of a watermark decoder) in conjunction with codes detected by another type of recognition unit (a 1D barcode reader). More specifically, these embodiments redress the situation where these codes are intended to convey the same identifier of the product, such as its GTIN, yet are in conflict. For example, this occurs when the watermark decoder detects a GTIN in conflict with a different GTIN detected by the barcode reader in a 1D barcode, such as a UPC. It also occurs where the watermark decoder detects conflicting GTINs.

These embodiments are implemented in control logic in the scanner. For example, the control logic is in the controller 140 (FIG. 5), or controller 160 (FIG. 6). This control logic is implemented in software instructions executing in a processor of the scanner, or in a digital logic circuit, such as an ASIC or FPGA. In one configuration, the control logic comprises a code filter that operates on codes from detection results, namely GTINs, from the 1D barcode and watermark recognition units.

In one such an arrangement, when the watermark decoder detects two conflicting identifiers in a single frame of captured imagery, the control logic filters out both identifiers and the scanner passes neither to the POS terminal. Instead, the control logic logs the two identifiers (GTINs) in a "blacklist." The control logic checks this list each time an identifier is decoded from a watermark payload. If a decoded identifier is found on the blacklist, the control logic filters it out and scanner does not report it to the POS terminal. The scanner does not issue a confirmatory "beep" indicating a successful read. The checker (or customer) will then re-swipe the product.

The re-swipe will not lead to a watermark-based product identification, as the identifiers are now on the blacklist, so a "beep" will again not issue. At this point, the checker will resort to the old method of turning the 1D black/white barcode to the scanner. When the scanner senses the barcode and decodes the identifier from it, it passes the identifier to the POS station, and the POS tallies the item.

In a variant embodiment, the conflicting identifiers from watermarks need not appear in the same frame. Blacklisting occurs if the conflicting GTINs are decoded within a threshold number of frames (e.g., 5), or a threshold interval of time (e.g., 200 milliseconds) of each other. GTINs that are decoded within such frame or time interval—whether decoded from black and white barcode or digital watermark—are termed "proximate" GTINs. If they are conflicting, they are detected as "proximate but conflicting" GTINs.

This protocol can also be extended to the case in which a conventional 1D barcode is found to encode a GTIN that conflicts with the GTIN of a proximate watermark. That is, if any proximate but conflicting GTINs are identified—regardless of whether they are conveyed by 1D barcode or watermark, any GTIN decoded from a watermark involved in such conflict is added to the watermark blacklist. There may be more than one.

It will be recognized that such arrangement may sometimes lead to a single product being mis-tallied. Consider a situation in which a GTIN is decoded from a watermark, by itself. Its GTIN is passed to the point of sale terminal and added to the checkout tally, as is the normal operation. However, if two or three frames later (but still proximate), a different GTIN is decoded from a barcode, a case of proximate but conflicting GTINs has arisen. In such case, the second-decoded identifier from the barcode is not added to the tally, and the watermarked GTIN earlier decoded and reported to the point of sale system is now added to the blacklist. The tally includes the first-identified product, but not the second. If the first identification is errant (e.g., due to inclusion of an improper plate or separation in the printing process), the product will be mis-identified on the tally. But the greater evil—charging the consumer for two items when only one is presented—is avoided.

In a related scenario, if a first GTIN is decoded from a watermark and, two or three frames later, a different GTIN is decoded from a watermark, a different case of proximate but conflicting GTINs has arisen. The first one will appear on the checkout tally, but not the second. And both will then be added to the blacklist.

The time or frame count interval that defines "proximate" decoding is restarted each time a watermark or barcode decoder finds a GTIN in some embodiments. (Commonly, in a swipe of a package past the camera system, a GTIN will be decoded from a watermark in each of the frames in which the package is in view, e.g., 4-10.) The threshold interval (e.g., of frames or time) must thus elapse without any GTIN detection before the process resets. Until the process resets, any decoding of a different GTIN—whether from a barcode or watermark—will cause the control logic not to report second and following GTINs to the point of sale system, and will cause the control logic to blacklist any watermarked GTINs that are involved.

To be clear, the blacklist only serves to disable reports of listed GTINs to the point of sale system when such GTINs are decoded from a watermark. If a blacklisted GTIN is decoded from a traditional barcode, the blacklist is not involved. However, a GTIN decoded from a traditional barcode may not be reported to the point of sale system, if a different GTIN was previously reported within the threshold time interval or frame count.

FIGS. 15A-C provide Python code detailing an example embodiment of the above-described process. (DB refers to a watermark, and 1D refers to a traditional barcode.)

Periodically, the blacklist from each scanner is uploaded to a remote server. Each entry in the blacklist is stored with an associated time-stamp. If two (or more) scanners both report proximate but conflicting decodes involving watermarked GTINs A and B, then that product has likely been double-marked with conflicting GTINs. Remedial steps can then be taken, to ensure that the packaging is corrected prior to the next press run. Meanwhile, the product will remain on the blacklist of each scanner that has detected the conflict and will not be watermark-recognized. In some embodiments, a common blacklist is maintained for all POS terminals in a store, or for all POS terminals of a particular store chain in a region, state, or nation.

In some arrangements, GTINs from watermarks may "age-off" the blacklist after a certain period has elapsed, such as a week (or month) after the proximate but conflicting detection. This helps address the situation in which a blacklist entry is caused not by a single product that has been marked with two different GTINs, but rather by a checker passing two items past the scanner in quick succession. In such case, watermark detection for the blacklisted product(s) resumes a week (or month) after the double-detection event. (If, in fact, a double-marked product is the culprit, it will be restored to the blacklist soon after aging-off, i.e., the next time the scanner again detects its two proximate but conflicting GTINs.)

The most likely scenario in which double-marking conflict may occur is when a separation or printing plate for one product is mistakenly used when printing a brand-mate product (e.g., lemon soda and lime soda). A plate used to print a dish soap label would not be used to print a soda can.

In accordance with a different aspect of the technology, two proximate but conflicting GTINs from watermarks are not added to the blacklist unless both indicate the same manufacturer. The GTIN numbering standard, developed by the GS1 trade group, includes a sub-field of the identifier that serves to indicate the manufacturer (the "Company Prefix"). If two detected watermarks are proximate and conflicting, and the GTIN encoded in the first indicates Hostess Brands, and the GTIN encoded in the second indicates McCormick & Co., then both decoded GTINs may be passed to the POS terminal, with neither added to the blacklist. In contrast, if both GTINs indicate Hostess Brands, then both GTINs are added to the blacklist, since this more likely indicates a double-marked package.

GS1 Company Prefixes are actually of variable length, commonly 6 to 10 digits. Given this variability, the first six digits of the Company Prefix fields of two watermark GTINs can be checked, and the GTINs are added to the blacklist only if these 6 digits of the Company Prefix field match. In some cases, the Prefixes assigned to an entity may vary. The control logic tracks these cases with a data table relating the Prefixes assigned to that entity or brand. The control logic checks the table at runtime to identify GTINs originating from the same entity or brand.

In addition to the Company Prefix, GTIN identifiers also include a product code portion (an "Item Reference"). Within a particular company, these codes are often logically grouped based on product segments. Kraft Foods, for example, owns the brands Jell-O, Planters, Tang, Velveeta, and dozens of others. The Item Reference codes assigned to related products are commonly numerically near each other.

Again, it is unlikely that a separation or printing plate used in production of packaging for Jell-O gelatin would be used in packaging for Planters nuts. We refer to these Prefixes, Item Identifiers and like codes as source identifiers. The scanner logic analyzes the source identifiers from detection results to determine whether identifiers in detection results are likely from a common source, such as a company, brand or product line. The process of determining whether it is likely includes comparing to detect a match, and/or determining proximity of source identifiers.

Thus, in accordance with another aspect of the technology, a pair of proximate but conflicting watermarked GTINs are not added to the blacklist unless their manufacturer codes match AND their product codes are within a threshold numeric distance of each other, e.g., 100 or 1000. By such arrangement, if GTINs of watermarks are decoded, from proximate frames, reporting detection of both a box of Jell-O gelatin and a can of Planters nuts, it is unlikely these GTINs would be added to the blacklist, because they are likely not numerically near enough. In contrast, if the scanner reports proximate but conflicting GTINs from watermarks indicating both cherry and strawberry variants of a Jell-O gelatin product, then these GTINs would almost certainly be numerically-close, and thus added to the blacklist.

In yet another variant, if two proximate but conflicting GTINs from watermarks are detected, and before the threshold interval elapses, a traditional black and white barcode is also detected, the GTIN decoded from the traditional barcode is compared against the two different GTINs from watermarks. If either GTIN from watermarks matches the barcoded GTIN, it is taken as the correct identifier for the product, and that GTIN is passed to the POS terminal and added to the checkout tally. In such case, only the odd GTIN, which does not match the barcode payload, is added to the blacklist.

For performance reasons, it is desirable to minimize or avoid delay in reporting a GTIN to the POS and issuing the confirming output of a successful read to the checker (the familiar confirming beep). To minimize delay in reporting and outputting the beep in one embodiment, the control logic passes a first detected GTIN for reporting to the POS and issues a control signal to output the confirming beep, regardless of whether it originated from a 1D barcode or watermark. A GTIN is deemed first when a time interval has not been initiated for another GTIN (or if it has, that interval is over at the time of arrival of the GTIN at the control logic). In addition to passing the first GTIN for reporting, the control logic stores that GTIN and starts a time out interval. In the time interval before the time out, the control logic compares subsequent GTINs detected from 1D barcodes and watermarks with the stored GTIN. For GTINs that do not match the stored GTIN in this time interval, it adds them to the blacklist.

An embodiment executes the processing flow of FIG. 9. The recognition units operate on image blocks and provide their detection results (GTIN or not) as shown in blocks 203 and 204. The control logic evaluates state by checking the incoming GTIN against previously detected GTIN(s) having a timer that has not timed out (205). The control logic updates state by storing a first GTIN when this first GTIN is detected at a time where no other GTINs have timers that are still counting toward the time interval set for proximate GTINs. However, as noted in the previous paragraph, to avoid introducing delay in reporting, the control logic passes the first GTIN to report it (decision 207 and operation 208), rather than waiting for additional checks during the time interval. The control logic initiates a timer (209) for this first GTIN to start a time interval for detecting proximate GTINs, and processing proceeds with subsequent detection results as described above. In the processing of subsequent detection results, the control logic blocks conflicting GTINs and adds them to the blacklist according to the various embodiments described above.

The above-detailed methods to avoid double-charging a customer are related to the barcode-based methods to avoid double-charging a customer that are detailed in U.S. Pat. Nos. 5,365,048 and 6,698,658, and patent publication 20100123005. (These patent documents are incorporated herein by reference.) Thus, according to further aspects of the present technology, features of applicant's above-described arrangements (e.g., the blacklist, its management, etc.) can be incorporated into the arrangements detailed in these documents, and features detailed in these documents (e.g., tracking positions of barcode patterns located in first and second frames, and incorporation of a weigh scale, etc.) can be included with applicant's above-described arrangements. Such combinations are expressly contemplated as part of applicant's present inventive work.

Figure 16:
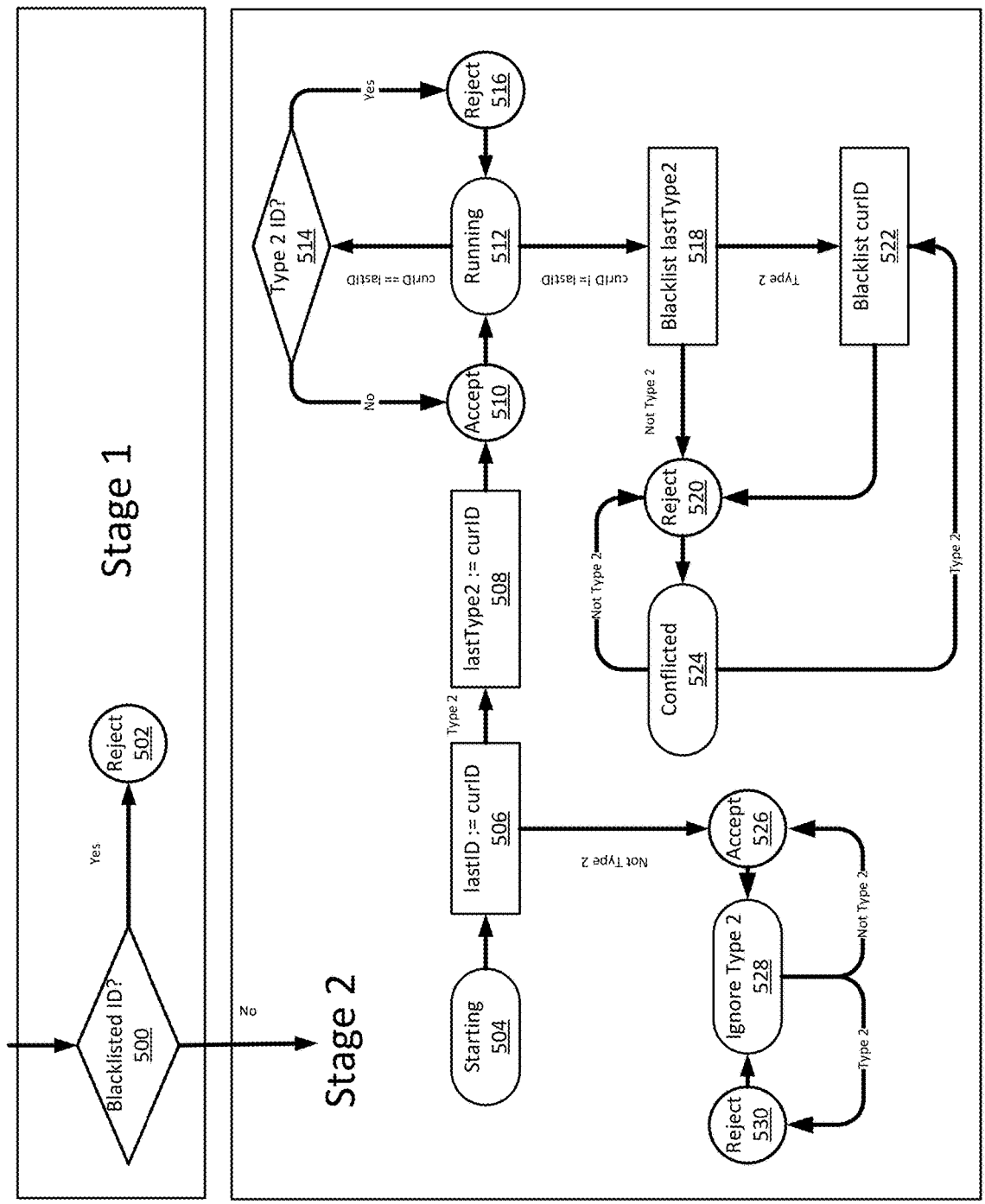
FIG. 16 is a diagram illustrating an embodiment of code filter logic in a scanner for resolving code conflicts and generating a blacklist.

FIG. 16 is a diagram illustrating an embodiment of code filter logic in a scanner. This code filter implements a state machine, with two stages. In this embodiment, the code filter logic processes identifiers from two recognition units that employ a different type of recognition. A first type of recognition unit decodes a 1D barcode to obtain a GTIN identifier. The 1D barcode is usually localized to one or a few locations on an object. A second type of recognition unit decodes an identifier from a data carrier that is replicated over the object in repeated instances, and each instance carries the GTIN identifier. A specific example of this second type is a digital watermark, tiled over the surface of the object. Both recognition units, therefore, decode identifiers of the same type, but from different types of recognition. Due to the replicated instances over the object, the scanner is likely to detect a GTIN from a watermark first, but that is not always the case.

In some embodiments, the logic maintains state for IDs and associated blacklist based on brand or company. In this case, the scanner has or instantiates in memory instances of the state machine for each product source. The reason for this is to manage conflicts of IDs within products from a particular source, such as a company, or within a brand of that company. For example, this applies where the company code or like source identifier is used to detect conflicts, as described above. For an incoming ID, pre-filter control logic determines whether the ID has a source identifier that is in proximity or matches a previous ID for which a state machine has been instantiated. When it detects such proximity or match indicating a likely common source, it proceeds to process the incoming ID in the instance of the state machine for that common source. When it does not detect such proximity or match, it instantiates a state machine for the source. Alternatively, the scanner logic has a predetermined number of state machine instances that are pre-assigned product sources, or are dynamically assigned product sources as they are identified in incoming detection results. The pre-filter evaluates by compare or proximity measurement (e.g., ID distance) the incoming ID against the stored source identifiers, and routes the incoming ID to the state machine for the common product source, if any.

The code filter logic has two stages. A first stage determines if an incoming identifier (shown as ID) is blacklisted (500). If so, the logic rejects it (502), and as a result, the scanner does not report it or output a confirming signal. A second stage determines whether to accept or reject non-blacklisted IDs. The filter logic maintains a blacklist for IDs by recognition type (e.g., and possibly by source, company or brand). In this embodiment, for example, the logic maintains a blacklist for IDs of the second type of recognition.

Before explaining the logic of stage 2, we begin with description of the notation.

The variable, lastID, represents the value of the ID (e.g., GTIN) processed previously by the filter (if any, stored for a time interval of a timeout period).

The variable, lastType2 represents the value of the ID from a type 2 recognition processed previously by the filter (if any, stored for a time interval).

The variable, curID represents the value of the ID of the current incoming ID to the filter logic.

The oval shaped elements, e.g., 504, are processing states of the filter logic. Processing begins and ends at a state. Processing begins where a previous ID (if any) ended. Processing flow proceeds from this beginning state to an "accept" or "reject" output (e.g., 502), and ends at an end state shown by arrows from the output. "Accept" output means that the ID is accepted for reporting to the POS, and the scanner produces a confirming output (e.g., beep) indicating successful scan. "Reject" output means that the ID is rejected for reporting and confirming output. Rectangles (e.g., 506, 508, 518, 522) illustrate actions that the filter executes. In particular, the actions are as follows:

lastID:=curID (506) means to assign the value of the current ID, curID, to the lastID storage in memory.

lastType2:=curID (508) means to assign the value of the current ID, curID to the lastType2 storage.

BLACKLIST lastType2 (518) means to add the value of lastType2 ID to the blacklist.

BLACKLIST curID (522) means to add the value of the current ID to the blacklist.

The logic of stage 2 begins in "starting" state 504 when a previous ID is not within a timeout interval. This corresponds to the first time the scanner scans a non-blacklisted ID from an object presented within its field of view. As shown, processing proceeds to block 506, which sets the value of the current ID in memory. When the ID is from recognition type 2, block 508 sets the lastType2 value in memory to that of the current ID. The logic accepts the ID at 510 and processing ends at the running state 512. When the ID is from type 1 recognition (e.g., 1D barcode), the logic accepts the ID at 526 and processing ends at the "Ignore Type 2" state 528.

When the stage 2 logic receives an ID while in running state 512, it checks whether the value of the current ID matches the value of the last ID. If there is a match, processing proceeds depending on type of recognition. When the recognition type is not type 2 as shown in decision logic 514, the logic accepts it at 510. This embodiment represents a preference to accept type 1 IDs. Other logic in the scanner that receives the stage 2 filter output can handle duplicates of conventional 1D codes as it chooses. When the recognition type of the incoming ID is type 2, the logic rejects the ID, as it has already passed previously in a prior processing state.

Continuing with the running state 512, when the current ID does not match the last ID, there is a conflict between proximate IDs, likely scanned from an object. The logic adds the last type 2 ID from memory to the blacklist in memory as shown at block 518. Then processing proceeds, depending on recognition type. When the ID is not from recognition type 2, it is rejected at 520. When the ID is from recognition type 2, the logic adds the current ID to the blacklist at 522, and rejects it at 520. In both cases, the processing state proceeds to the conflicted state 524, which means a conflict has been detected and no further incoming IDs are accepted in a timeout interval.

When another ID enters the filter in the conflicted state 524, IDs of both types are rejected at 524. Type 2 IDs are blacklisted as shown by the arrow from 524 to 522.

When an ID enters the filter in the "Ignore Type 2" state 528, IDs from type 2 recognition are ignored. This embodiment deals with situations where it is unlikely that a type 2 ID will be detected after a type 1 ID in a timeout interval, and thus, there is no need to blacklist it. An alternative embodiment, discussed below, the logic blacklists type 2 IDs received in this state. IDs not from type 2 recognition are accepted at 526.

Figure 17:
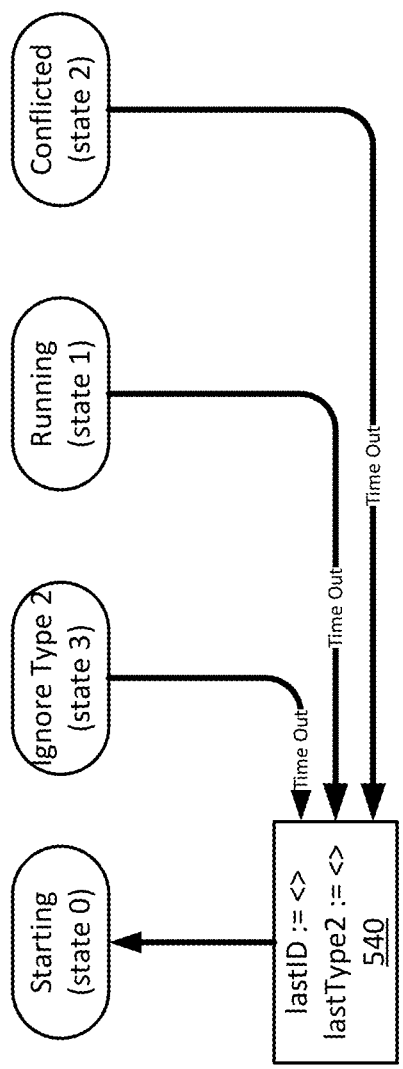
FIG. 17 is a diagram illustrating state transition of control logic as a result of passage of time intervals triggered by detection results.

FIG. 17 is a diagram illustrating state transition of control logic as a result of passage of time intervals triggered by detection results. In addition to the state transitions shown in FIG. 16, the logic resets filter state back to the "starting" state whenever the time between IDs supplied to the filter exceeds a configurable time interval, referred to as a timeout interval. This state change happens before the incoming ID is processed by the stage 2 state machine. The logic clears lastID and lastType2 variables to empty in storage as shown block 540.

FIGS. 18A-D provide Python code detailing another embodiment of scanner control logic for generating a blacklist dynamically. This embodiment corresponds to the processing flow and state machine logic of FIGS. 16 and 17. The state number 0-3 shown in FIG. 17 corresponds to the state numbers 0-3 in this software code. The code provides an example where the ID in that generalized embodiment of FIG. 16 is a GTIN. Type 2 recognition is watermark recognition, using Digimarc Barcode (DB) technology. Non-type 2 recognition is decoding of a GTIN from a 1D barcode.

Figure 19:
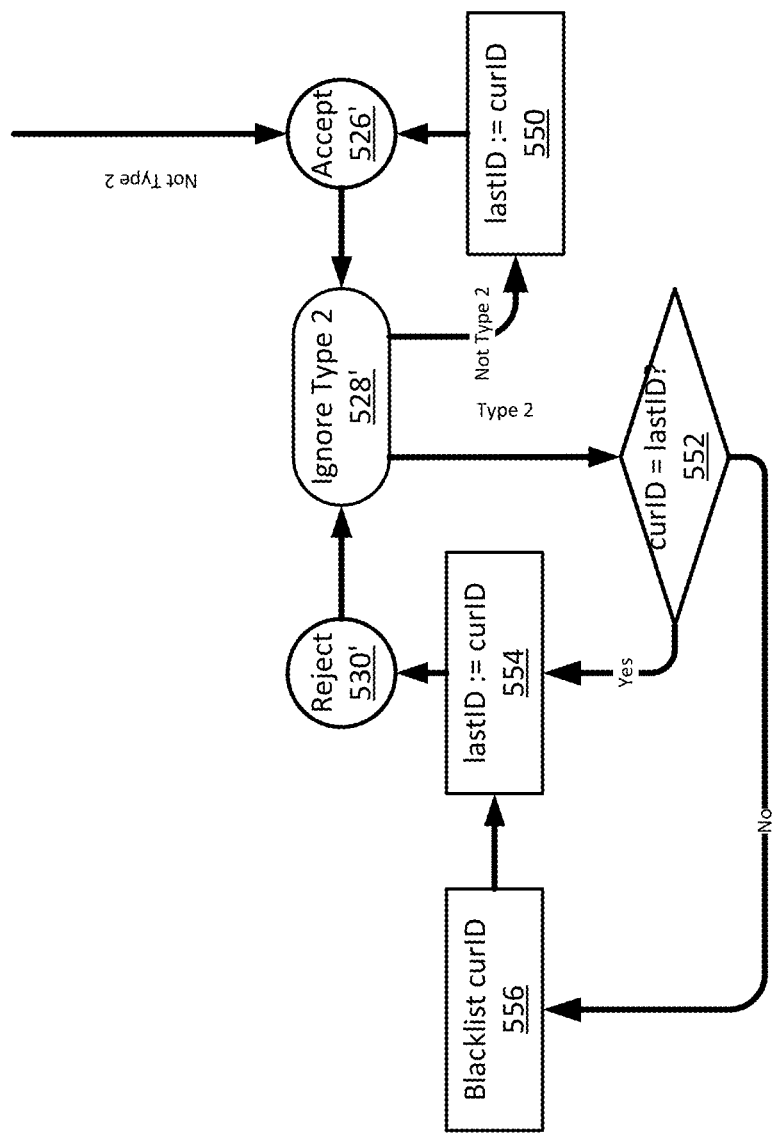
FIG. 19 is a diagram illustrating a variant of logic of FIG. 16.

FIG. 19 is a diagram illustrating a variant of logic of FIG. 16. In particular, this logic is a variant of the processing logic around the "Ignore Type 2" state. Recall that stage 2 enters this state when a first ID detected is not type 2. The logic enters this state (528') after accepting the first ID at 526' (the notation of 526', 528' and 530' reflects the relationship of this logic to FIG. 16 logic at 526, 528 and 530). Processing then flows from state 528' for subsequent incoming IDs during the timeout interval. For non type 2 IDs detected in this state (e.g., GTINs from 1D barcodes), the logic updates the variable, lastID to the current ID value at 550 and accepts it.

For type 2 IDs detected in this state (e.g., GTINs from watermarks), the logic determines whether the current ID matches the value of the lastID variable stored in memory at 552. If they match, the logic updates the value of lastID to the current ID at 554 and rejects the current ID. If they do not match, the logic adds the current ID to the blacklist (556) and rejects it.

Operating Environment

The components and operations of the encoder and decoder are implemented in modules. Notwithstanding the specific discussion of the embodiments set forth herein, the term "module" refers to software, firmware or circuitry configured to perform the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in Matlab, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in combination, hardwired circuitry, programmable circuitry such as computer processors comprising one or more individual instruction processing cores, state machine circuitry, or firmware comprised of instructions executed by programmable circuitry.

Implementation can additionally, or alternatively, employ special purpose electronic circuitry that has been customdesigned and manufactured to perform some or all of the component acts, as an application specific integrated circuit (ASIC). To realize such an implementation, the relevant module(s) (e.g., encoding and decoding of machine readable auxiliary messages) are first implemented using a general purpose computer, using software such as MatLab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The particular combinations of elements and features in the above-detailed embodiments are exemplary only; the interchanging and substitution of these teachings with other teachings in this and the incorporated-by-reference patents/applications are also contemplated.

We claim:

1. In a POS system a method of automatic product identification, the method executing within a processor, and comprising:
    obtaining a first detection result from a first recognition unit, the first recognition unit configured to detect a digital payload from a two-dimensional code in which the digital payload is encoded within an image captured of a first object in a view volume of a scanner;
    obtaining a second detection result from a second recognition unit, the second recognition unit configured to detect a digital payload from a one-dimensional barcode within an image captured of the first object;
    determining presence of a conflict among the two-dimensional and one-dimensional code by proximity of the two-dimensional code to the one-dimensional barcode in time or location on the first object; and
    determining identity of the first object to use in associating price with the first object in a POS system based on the determining of the presence of the conflict.

2. The method of claim 1 wherein the two-dimensional code encodes a first identifier and the one-dimensional barcode encodes a second identifier; and further comprising: dynamically generating a blacklist by adding the first or second identifier to a blacklist of identifiers when the first and second identifiers are detected to be proximate and not matching.

3. The method of claim 2 wherein the two-dimensional code and one-dimensional barcode encode a source identifier and determining the presence of the conflict comprises determining whether the source identifiers encoded in the two-dimensional code and one-dimensional barcode are likely from a common source.

4. The method of claim 1 wherein the first object comprises a family pack, and the two-dimensional code identifies one of a member of the family pack or the family pack, and the one-dimensional barcode identifies the other of the member of the family pack or the family pack.

5. The method of claim 4 wherein one of the two-dimensional code or the one-dimensional barcode is sensed from an overwrap of the family pack, and the other of the two-dimensional code or one-dimensional barcode is sensed from packaging of a member of the family pack.

6. The method of claim 1 wherein the first object has a price change label, and one of the two-dimensional code or the one-dimensional barcode is on the price change label, and the other of the two-dimensional code or one-dimensional barcode comprises a separate product identifier on the first object to which the price change label is applied.

7. The method of claim 1 wherein the two-dimensional code comprises contiguous image signal tiles in which a digital payload is redundantly encoded.

8. A point of sale system for automatic recognition of objects, the system comprising:
at least one processor in communication with an imager and plural recognition units;
the at least one processor configured to execute a controller process, the controller process comprising instructions executed by the at least one processor to:
obtain detection results from the plural recognition units based on at least one frame captured by the imager of at least one object in a view volume of the imager; wherein the detection results include a first identifier from a one-dimensional barcode and a second identifier in a two-dimensional code, each detected from a first object by different types of recognition units;
determine presence of a conflict among the two-dimensional and one-dimensional code by proximity of the two-dimensional code to the one-dimensional barcode in time or location on the first object; and
determine identity that the point of sale system uses for the first object based on evaluation of the presence of the conflict.

9. The system of claim 8 further comprising:
dynamically generating a blacklist by adding the first or second identifier to a blacklist of identifiers when the first and second identifiers are detected to be proximate and not matching.

10. The system of claim 8 wherein the two-dimensional code and one-dimensional barcode encode a source identifier and the at least on processor is configured to determine the presence of the conflict by determining whether the source identifiers encoded in the two-dimensional code and the one-dimensional barcode are likely from a common source.

11. The system of claim 8 wherein the first object comprises a family pack, and the two-dimensional code identifies one of a member of the family pack or the family pack, and the one-dimensional barcode identifies the other of the member of the family pack or the family pack.

12. The system of claim 11 wherein one of the two-dimensional code or the one-dimensional barcode is sensed from an overwrap of the family pack, and the other of the two-dimensional code or one-dimensional barcode is sensed from packaging of a member of the family pack.

13. The system of claim 8 wherein the first object has a price change label, and one of the two-dimensional code or the one-dimensional barcode is on the price change label, and the other of the two-dimensional code or one-dimensional barcode comprises a separate product identifier on the first object to which the price change label is applied.

14. The system of claim 8 wherein the two-dimensional code comprises contiguous image signal tiles in which a digital payload is redundantly encoded.

15. A non-transitory computer readable medium on which is stored instructions, which when executed on a processor, perform the acts of:
obtaining a first detection result from a first recognition unit, the first recognition unit configured to detect a digital payload from a two-dimensional code in which the digital payload is encoded within an image captured of a first object in a view volume of a scanner;
obtaining a second detection result from a second recognition unit, the second recognition unit configured to detect a digital payload from a one-dimensional barcode within an image captured of the first object;
determining presence of a conflict among the two-dimensional and one-dimensional code by proximity of the two-dimensional code to the one-dimensional barcode in time or location on the first object; and
determining identity of the first object to use in associating price with the first object in a POS system based on the determining of the presence of the conflict.

16. The non-transitory computer readable medium of claim 15 wherein the two-dimensional code encodes a first identifier and the one-dimensional barcode encodes a second identifier; and further comprising instructions to configure a processor to perform the act of: dynamically generating a blacklist by adding the first or second identifier to a blacklist of identifiers when the first and second identifiers are detected to be proximate and not matching.

17. The non-transitory computer readable medium of claim 15 wherein the two-dimensional code and one-dimensional barcode encode a source identifier and determining the presence of the conflict comprises determining whether the source identifiers encoded in the two-dimensional code and one-dimensional barcode are likely from a common source.

18. The non-transitory computer readable medium of claim 15 wherein the first object comprises a family pack, and the two-dimensional code identifies one of a member of the family pack or the family pack, and the one-dimensional barcode identifies the other of the member of the family pack or the family pack.

19. The non-transitory computer readable medium of claim 15 wherein one of the two-dimensional code or the one-dimensional barcode is sensed from an overwrap of the family pack, and the other of the two-dimensional code or one-dimensional barcode is sensed from packaging of a member of the family pack.

20. The non-transitory computer readable medium of claim 15 wherein the first object has a price change label, and one of the two-dimensional code or the one-dimensional barcode is on the price change label, and the other of the two-dimensional code or one-dimensional barcode comprises a separate product identifier on the first object to which the price change label is applied.

* * * * *